US010253782B2

(12) United States Patent
Sato

(10) Patent No.: US 10,253,782 B2
(45) Date of Patent: Apr. 9, 2019

(54) SHAPED COMPONENT FOR ALUMINUM ALLOY TURBO COMPRESSOR WHEEL AND METHOD OF MANUFACTURING TURBO COMPRESSOR WHEEL

(71) Applicant: SHOWA DENKO K.K., Tokyo (JP)

(72) Inventor: Masahiro Sato, Kitakata (JP)

(73) Assignee: SHOWA DENKO K.K., Minato-Ku, Tokyo (JP)

( * ) Notice: Subject to any disclaimer, the term of this patent is extended or adjusted under 35 U.S.C. 154(b) by 470 days.

(21) Appl. No.: 15/102,585

(22) PCT Filed: Dec. 10, 2014

(86) PCT No.: PCT/JP2014/082663
§ 371 (c)(1),
(2) Date: Jun. 8, 2016

(87) PCT Pub. No.: WO2015/087907
PCT Pub. Date: Jun. 18, 2015

(65) Prior Publication Data
US 2016/0312787 A1 Oct. 27, 2016

(30) Foreign Application Priority Data
Dec. 13, 2013 (JP) .................................. 2013-258638

(51) Int. Cl.
F04D 29/02 (2006.01)
B21K 3/04 (2006.01)
(Continued)

(52) U.S. Cl.
CPC .............. F04D 29/023 (2013.01); B21K 3/04 (2013.01); B22D 11/00 (2013.01); B22D 11/003 (2013.01);
(Continued)

(58) Field of Classification Search
CPC .... F04D 29/023; F04D 29/266; F04D 29/284; F02B 39/00; B22D 11/00; B22D 11/003;
(Continued)

(56) References Cited

U.S. PATENT DOCUMENTS

2002/0185244 A1* 12/2002 Decker ..................... B22C 7/02
164/35
2005/0167009 A1* 8/2005 Shoji ....................... C22C 21/00
148/417
(Continued)

FOREIGN PATENT DOCUMENTS

JP 9-57415 A 3/1997
JP 11-170014 A 6/1999
(Continued)

OTHER PUBLICATIONS

International Search Report of PCT/JP2014/082663, dated Feb. 3, 2015. [PCT/ISA/210].
(Continued)

Primary Examiner — Igor Kershteyn
(74) Attorney, Agent, or Firm — Sughrue Mion, PLLC

(57) ABSTRACT

The present invention provides a shaped component for a compressor wheel that can be used to manufacture a turbo compressor wheel which is excellent in terms of high-temperature strength, rigidity, and dynamic balance and, furthermore, has optimal performance suitable for diverse required characteristics in individual portions. In the shaped component for an aluminum alloy turbo compressor wheel of the present invention, a continuous casting rod-shaped material having a small diameter or a forging-completed material obtained by carrying out hot closed die forging on the continuous casting rod-shaped material having a small diameter is used as a material, and the continuous casting rod-shaped material or the forging-completed material has a structure in which the average numbers of grain boundaries (Continued)

intersected in a circumferential direction on a transverse section orthogonal to a casting direction and a forging direction are minimized in a central portion and are maximized in an outer circumferential portion, and the casting direction and the forging direction of the material are along a rotational center axis line direction of a compressor wheel.

21 Claims, 12 Drawing Sheets

(51) Int. Cl.
    *B22D 11/00*      (2006.01)
    *B23P 15/02*      (2006.01)
    *F01D 5/04*      (2006.01)
    *F02B 39/00*      (2006.01)
    *F04D 29/26*      (2006.01)
    *C22C 21/00*      (2006.01)
    *F04D 29/28*      (2006.01)

(52) U.S. Cl.
    CPC .............. *B23P 15/02* (2013.01); *C22C 21/00* (2013.01); *F01D 5/048* (2013.01); *F02B 39/00* (2013.01); *F04D 29/266* (2013.01); *F04D 29/284* (2013.01); *F05D 2220/40* (2013.01); *F05D 2230/21* (2013.01); *F05D 2230/25* (2013.01); *F05D 2300/173* (2013.01); *F05D 2300/502* (2013.01); *F05D 2300/518* (2013.01); *F05D 2300/60* (2013.01)

(58) Field of Classification Search
    CPC . B21K 3/04; C22C 21/00; B23P 15/02; F05D 2220/40; F05D 2230/21; F05D 2230/25; F05D 2300/173; F05D 2300/502; F05D 2300/518; F05D 2300/60
    See application file for complete search history.

(56) References Cited

U.S. PATENT DOCUMENTS

| | | | |
|---|---|---|---|
| 2009/0196762 A1* | 8/2009 | Koga | B22D 15/005 416/241 R |
| 2016/0153073 A1* | 6/2016 | Parson | C22C 21/00 428/586 |
| 2016/0245296 A1* | 8/2016 | Takahashi | B22D 21/007 |
| 2016/0319400 A1* | 11/2016 | Hohenstein | C22C 21/14 |
| 2017/0107600 A1* | 4/2017 | Kubo | B22C 9/28 |

FOREIGN PATENT DOCUMENTS

| | | |
|---|---|---|
| JP | 2000-197943 A | 7/2000 |
| JP | 2005-206927 A | 8/2005 |
| JP | 2006-305629 A | 11/2006 |
| JP | 2008-121057 A | 5/2008 |
| JP | 2008-132513 A | 6/2008 |
| JP | 2009-66601 A | 4/2009 |

OTHER PUBLICATIONS

Written Opinion of PCT/JP2014/082663, dated Feb. 3, 2015. [PCT/ISA/237].

Communication dated Jun. 5, 2018, from the Japanese Patent Office in counterpart application No. 2015-552479.

* cited by examiner

SHAPED COMPONENT FOR ALUMINUM ALLOY TURBO COMPRESSOR WHEEL AND METHOD OF MANUFACTURING TURBO COMPRESSOR WHEEL

CROSS REFERENCE TO RELATED APPLICATIONS

This application is a National Stage of International Application No. PCT/JP2014/082663 filed Dec. 10, 2014, claiming priority based on Japanese Patent Application No. 2013-258638, filed Dec. 13, 2013, the contents of all of which are incorporated herein by reference in their entirety.

BACKGROUND OF THE INVENTION

Field of the Invention

The present invention relates to a shaped component for an aluminum alloy turbo compressor wheel used in a turbocharger used in an internal combustion engine for a transportation device such as an automobile and a method of manufacturing a turbo compressor wheel.

Priority is claimed on Japanese Patent Application No. 2013-258638, filed Dec. 13, 2013, the content of which is incorporated herein by reference.

Description of Related Art

It is well known that a turbocharger used in an internal combustion engine for a transportation device is an apparatus in which, when a compressor wheel (also called an impeller) connected to a turbine that is rotated using the pressure of exhaust gas through a connecting shaft rotates, air is sent to a compressor housing and is compressed, and the compressed air is sent into a combustion chamber, thereby increasing the combustion efficiency of the internal combustion engine and thus achieving improvement in the output of the internal combustion engine and the purification of exhaust gas. The above-described turbocharger has a structure in which, generally, a turbine side (exhaust gas) and a compressor side (intake side) are separately provided and an adiabatic bearing is disposed therebetween. In the compressor side, the compressor wheel is disposed in the center of the compressor housing.

The above-described compressor wheel in a turbocharger apparatus generally has a constitution in which, on the outer circumferential side of a rotary shaft portion that generally forms a conical shape, a plurality of thin curved blade portions (wing portions) for rapidly collecting air are radially formed so as to form a part of a whirlpool. In addition, the compressor wheel is disposed in the central portion of a housing including a snail-shaped swirling tube.

As a typical example of a compressor wheel, FIGS. 1 to 3 illustrate an example of the overall scheme of a basic shape thereof, and sections of main parts thereof are illustrated in an enlarged manner in FIG. 4.

In FIGS. 1 to 4, a compressor wheel 1 has a structure in which a plurality of radial blade portions 4 are integrally formed on the outer circumferential side of a substantially conical rotary shaft portion 3 including a shaft hole 2 for press-fitting a shaft that is connected to a turbine-side rotor, not illustrated, into the rotary shaft portion. Here, in the edge portion of the blade portion 4, the edge portion (edge portion) 4A inclined in a twisted and curved shape (inclined in a twisted shape with respect to the rotational center axis line O) between the edge portion 4B on the air-intake side and the edge portion 4C on the air-discharge side is an edge portion forming a gap (so-called tip clearance) between the compressor housing and itself, that is, a portion called a tip edge portion.

The end portion of the rotary shaft portion 3 on the small diameter side serves as a boss portion 5 protruding from the end portion of the blade portion 4. In addition, a portion 7 continuing from the outer edge part (here, mainly, the portion near the boss portion 5 on one end side of the rotary shaft portion 3 is excluded) of the rotary shaft portion 3 to the blade portion 4, in other words, a portion rising from the outer circumferential part of the rotary shaft portion 3 to the blade portion 4 can be called a blade root portion 7. Meanwhile, in an actual compressor wheel, it is usual to provide a finer shape or form additional fine protrusion portions or additional recessed portions in the respective portions; however, herein, only basic parts are illustrated, and a detailed shape is not illustrated. In addition, in the case of a compressor wheel in a turbocharger in a transportation device such as an automobile, regarding the overall dimensions, for example, the maximum outer diameter from the rotation axis line O as a standard is often in a range of approximately 30 mm to 150 mm and the maximum length in a direction along the rotation axis line O is often in a range of approximately 20 mm to 100 mm.

Meanwhile, the compressor wheel in a turbocharger is rotated at high speed of faster than 10000 rpm at high temperature of approximately 150° C., and thus the compressor wheel needs to have high strength at high-temperature and high rigidity and, simultaneously, needs to have low weight in order to reduce energy loss. In addition, the compressor wheel also needs to have a favorable dynamic balance during high-speed rotation so as to withstand high-speed rotation and thus needs to have a uniform density in the circumferential direction (rotation direction).

Additionally, in the compressor wheel, it is effective to transfer heat from the turbine side to compressed air in order to increase the efficiency by means of an increase in the temperature of the compressed air, and thus the compressor wheel desirably has favorable heat-dissipating properties (heat conductivity).

Furthermore, when the respective portions of the compressor wheel are taken into account, the blade portion 4 needs to have a thin thickness (generally a thickness of smaller than 1 mm) in order to ensure a low weight. Therefore, it is desirable that the blade portion 4 not easily deform during high-speed rotation, and thus the blade portion 4 has favorable high-temperature strength and high rigidity, and, particularly, a portion near the tip edge portion 4A at the tip of the blade portion 4 has sufficiently favorable high-temperature strength and sufficiently high rigidity since this portion generally has an extremely thin thickness. Meanwhile, the blade root portion (the portion continuing from the rotary shaft portion 3 to the blade portion 4) 7 is a portion at which stress concentrates during rotation and thus needs to have a high notch fatigue strength in order to satisfy durability and reliability with respect to long-term use during high-speed rotation. The rotary shaft portion 3 is a portion supporting a plurality of the blade portions 4, and furthermore, when a turbocharger is assembled, it is usual to pressure-fit a shaft into the shaft hole 2 in the rotary shaft portion 3. Therefore, it is desirable that the rotary shaft portion 3 have a significantly thicker thickness than the blade portion, and furthermore, the boss portion 5 on one end side of the rotary shaft portion 3 needs to have favorable strength and elongation so as to prevent cracking during the pressure-fitting of the shaft.

As described above, in the compressor wheel, it is desirable that the compressor wheel have high strength at high temperature and high rigidity as a whole, have excellent dynamic balance during high-speed rotation, and have low weight, and simultaneously, the respective portions have different characteristics suitable for the functions, shapes, thicknesses, and the like of the respective portions.

Meanwhile, as a material for a compressor wheel in a turbocharger of the related art, from the viewpoint of, mainly, a low weight or thermal conductivity and, furthermore, processability and the like out of the above-described required characteristics, generally, an aluminum alloy is used.

In the related art, for this type of aluminum alloy compressor wheel, it has been usual that a shaped component is directly cast from a molten aluminum alloy using a casting method called a lost-wax method (also called a precision casting method), and an appropriate finish processing such as cutting is carried out on the precisely-cast shaped component, thereby completing a compressor wheel (for example, PTL 1 and the like).

In addition, as a method of manufacturing a rotary body such as a compressor wheel in a turbocharger, a method has also been proposed in which an extruded aluminum alloy (extruded billet) is used as a material, a forged shaped component is produced by forging the extruded billet, and furthermore, the forged shaped component is cut for completion (for example, PTL 2).

Additionally, in PTL 3, there is a proposal regarding a method in which, with an assumption that this method is a method of obtaining a rotary body such as a compressor wheel in a turbocharger from an aluminum alloy material by means of forging similarly to the case of PTL 2, in this case, an extruded billet is uniformly hardened as a whole in a forging step, that is, is hardened in three directions, thereby obtaining a forged shaped component in which there is no dead zone and a metal flow portion is almost uniformly present.

CITATION LIST

Patent Literature

[PTL 1] Japanese Unexamined Patent Application, First Publication No. 2005-206927
[PTL 2] Japanese Unexamined Patent Application, First Publication No. 2006-305629
[PTL 3] Japanese Unexamined Patent Application, First Publication No. 2000-197943

SUMMARY OF THE INVENTION

However, in the compressor wheel in a turbocharger, the thick portion (the rotary shaft portion) around the shaft hole and the thin portion (the blade portion) radially extending from the above-described thick portion are present in a mixed form as described above, and furthermore, the blade portion is extremely thin being smaller than 1 mm particularly in the tip portion (near the tip edge portion) of the blade portion and constitutes a complicated curved surface having a special shape, and thus, in a case in which a shaped component is manufactured using the precision casting method as described in PTL 1, a molten aluminum alloy does not sufficiently reach the thin portion when the molten aluminum alloy is poured into a lost-wax casting mold, and thus there are many cases in which internal defects such as porosity or oxides are generated in the thin portion or a finely-shaped portion cannot be accurately formed. Therefore, there is a problem in that the dimensional accuracy or strength of the thin blade portion or the thin blade root portion degrades, and consequently, the compressor wheel deteriorates in terms of the dynamic balance during high-speed rotation, and the yield of favorable products decreases. In addition, in a case in which a compressor wheel is manufactured using the precision casting method, there are many cases in which it is not possible to select the component composition of an aluminum alloy as the material from the viewpoint of molten alloy flowability during, mainly, casting and thus a variety of characteristics required for the compressor wheel, particularly, high-temperature strength or rigidity cannot be satisfied at all times. Furthermore, in a case in which a shaped component is manufactured using the precision casting method as described in PTL 1, generally, the structure becomes uniform as a whole, and thus it is difficult to fully satisfy a variety of requirements for individual portions of the compressor wheel.

In addition, in a compressor wheel obtained by forging an extruded material as a material as described in PTL 2, since the extruded material has a fibrous structure in which the extruded material extends to be long in the extrusion direction and forms a structure that is almost uniform in a radial direction (a structure in which grain diameters are almost uniform in the radial direction) when seen on a transverse sectional view orthogonal to the extrusion direction, even when a shaped component is produced by means of forging, the structure generally becomes almost uniform in the radial direction in the maximum diameter portion including a blade portion when seen on a transverse sectional view orthogonal to the central rotation axis line of the compressor wheel. In other words, this means that it is not possible to fully satisfy a variety of desired requirements for individual portions of the compressor wheel respectively.

Furthermore, as described in PTL 3, even in a case in which an extruded billet is forged in three directions, the structure becomes uniform as a whole, and thus it is difficult to fully satisfy a variety of desired requirements for individual portions of the compressor wheel respectively. In addition, in this case, although a roughly uniform structure can be obtained, forging is carried out in three directions in three separate steps, and thus the structure does not always become uniform in the circumferential direction from the rotation central position of the compressor wheel, and thus there is a concern that a product may deteriorate in terms of the dynamic balance of the compressor wheel during high-speed rotation.

The present invention has been made in consideration of the above-described circumstances, and an object of the present invention is to provide a shaped component for an aluminum alloy compressor wheel which is excellent in terms of high-temperature strength and rigidity as a whole, has an excellent dynamic balance during high-speed rotation, and furthermore, can be used to manufacture a compressor wheel having a variety of required characteristics and optical performance suitable for desired characteristics in individual portions respectively and, additionally, a method that can be actually used to manufacture an aluminum alloy compressor wheel having the above-described excellent performance.

In order to solve the above-described problems, the present inventors and the like repeated a variety of experiments and studies regarding a shaped component for an aluminum alloy turbo compressor wheel and consequently found that it is optimal to use a rod-shaped material with a small diameter obtained by means of continuous casting, that is, a cast material obtained by means of continuous casting with rapid solidification as a material, and particularly, it is optimal to use a continuous casting rod-shaped material having a most coarse structure in the central portion and a most dense structure in an outer circumferential-side portion as a cast structure in a transverse sectional direction orthogonal to the casting direction as a material. In addition, it was found that it is also effective to use the above-described continuous casting rod-shaped material having a small diameter as a material and carry out forging thereon, thereby producing a shaped component for a turbo compressor wheel. In addition, on the basis of the above-described findings, the present inventors completed an invention of a shaped component for an aluminum alloy turbo compressor wheel and an invention of a method of manufacturing a turbo compressor wheel.

In order to achieve the above-described object, the present invention provides individual aspects described in (1) to (21) below.

(1) A shaped component for an aluminum alloy turbo compressor wheel, in which a continuous casting rod-shaped material having a small diameter is used as a material, the material has a cast structure in which the average number of grain boundaries intersected in a circumferential direction seen on a transverse section orthogonal to a casting direction is minimized in a central portion of the transverse section and is maximized in an outer circumferential portion, and the casting direction of the material is extending along a rotational center axis line direction of the compressor wheel.

Meanwhile, in the present specification, the 'shaped component' refers to a member that will soon be subjected to cutting for forming a blade portion, punching for forming a shaft hole, and furthermore, a finish processing such as overall polishing, all of which are carried out in order to finally complete a turbo compressor wheel product. In other words, the shaped component refers to a member having an overall shape that is a rotary body shape which is axially symmetric with respect to the rotational center axis line O of the compressor wheel, having an outer surface shape that is larger than the outer shape of the compressor wheel, and furthermore, having a shape that corresponds to the outer shape of the compressor wheel (a shape that is almost the same as the outer shape of the compressor wheel; a shape which has no groove-shaped recessed portions formed between a plurality of blade portions and includes and surrounds the tip-side edge portions of a plurality of the blade portions), for example, substantially a circular top-truncated conical shape or a bell shape. That is, in a case in which the shaped component (1) is manufactured, it is usual to carry out a rough processing which is machining on a material (a continuous casting rod-shaped material having a small diameter) as described in (13) below, thereby processing the material into the circular top-truncated conical shape or the bell shape.

(2) The shaped component for an aluminum alloy turbo compressor wheel according to (1), in which the central portion of the material includes a portion which is intended to serve as a blade root portion in the turbo compressor wheel, and the outer circumferential portion includes a portion which is intended to serve as the blade portion on an outer circumferential side of the blade root portion in the turbo compressor wheel.

(3) The shaped component for an aluminum alloy turbo compressor wheel according to (1) or (2), in which the continuous casting rod-shaped material is a material that is continuously cast at a casting rate of 150 mm/minute or higher so as to obtain an outer diameter of 25 mm or larger and 120 mm or smaller.

(4) A shaped component for an aluminum alloy turbo compressor wheel which is made of a forged material obtained by hot forging a material made of a continuous casting rod-shaped material having a small diameter by means of closed die forging so that a forging pressurization direction is along a forging direction of the material and is along a rotational center axis line direction of the compressor wheel.

In (4), since the shaped component is produced by means of closed die forging, the shape of the shaped component generally becomes a shape that almost follows the outer shape of the compressor wheel, that is, substantially a circular top-truncated conical shape or a bell shape. Therefore, the "shaped component" in (4) generally refers to a member which is a forging-completed material obtained by means of closed die forging.

(5) The shaped component for an aluminum alloy turbo compressor wheel according to (4), in which the continuous casting rod-shaped material has a cast structure in which the average number of grain boundaries intersected in a circumferential direction seen on a transverse section orthogonal to a casting direction is minimized in a central portion and is maximized in an outer circumferential portion.

(6) The shaped component for an aluminum alloy turbo compressor wheel according to (5), in which the central portion of the continuous casting rod-shaped material includes a portion which is intended to serve as a blade root portion in the turbo compressor wheel, and the outer circumferential portion includes a portion which is intended to serve as the blade portion on an outer circumferential side of the blade root portion in the turbo compressor wheel.

(7) The shaped component for an aluminum alloy turbo compressor wheel according to any one of (4) to (6), in which the continuous casting rod-shaped material is a material that is continuously cast at a casting rate of 150 mm/minute or higher so as to obtain an outer diameter of 25 mm or larger and 120 mm or smaller.

(8) The shaped component for an aluminum alloy turbo compressor wheel according to any one of (4) to (7), in which the forged material has a forged structure in which the average number of grain boundaries intersected in the circumferential direction seen on a transverse section orthogonal to a forging pressurization direction at a position half as high as a total height of the closed forging die in a direction along the axial direction is minimized in the central portion and is maximized in the outer circumferential portion.

(9) The shaped component for an aluminum alloy turbo compressor wheel according to (8), in which the central portion of the forged material includes a portion which is intended to serve as a blade root portion in the turbo compressor wheel, and the outer circumferential portion includes a portion which is intended to serve as the blade portion on an outer circumferential side of the blade root portion in the turbo compressor wheel.

(10) The shaped component for an aluminum alloy turbo compressor wheel according to any one of (4) to (9), in which, as the material, a material having an outer diameter which is 0.10 mm to 2.0 mm smaller than an inner diameter of a portion corresponding to a maximum diameter portion of the compressor wheel or an inner diameter of a portion corresponding to an end portion of a blade portion on a minimum diameter side of the compressor wheel in the closed forging die is used.

(11) The shaped component for an aluminum alloy turbo compressor wheel according to any one of (1) to (10), in which, as the aluminum alloy, an Al—Cu—Mg-based alloy is used.

(12) The shaped component for an aluminum alloy turbo compressor wheel according to any one of (1) to (11), in which, as the aluminum alloy, an Al—Si eutectic alloy is used.

In addition, individual aspects below are aspects regarding a method of manufacturing an aluminum alloy turbo compressor wheel.

(13) A method of manufacturing a turbo compressor wheel including a continuous casting step of obtaining a small-diameter material having a cast structure in which the average number of grain boundaries intersected in a circumferential direction seen on a transverse section orthogonal to a casting direction is minimized in a central portion and is maximized in an outer circumferential portion by continuously casting an aluminum alloy to have a small diameter; and a finish processing step of machining the small-diameter material obtained from the continuous casting step into a compressor wheel shape so that the casting direction is along a rotational center axis line direction of the compressor wheel.

(14) The method of manufacturing a turbo compressor wheel according to (13), in which the continuous casting step is a step of continuous casting at a casting rate of 150 mm/minute or higher so as to obtain an outer diameter of 25 mm or larger and 120 mm or smaller.

(15) A method of manufacturing a turbo compressor wheel including a continuous casting step of obtaining a small-diameter material having a cast structure in which the average number of grain boundaries intersected in a circumferential direction seen on a transverse section orthogonal to a casting direction is minimized in a central portion and is maximized in an outer circumferential portion by continuously casting an aluminum alloy to have a small diameter; a forging step of determining a position of the small-diameter material obtained from the continuous casting step with respect to a forging die so that a central axis line of the small-diameter material coincides with a rotational center axis line of a compressor wheel product to be obtained and carrying out hot closed die forging so that a forging pressurization direction is along the casting direction of the small-diameter material; and a finish processing step of machining the forged material obtained from the forging step into a compressor wheel shape.

(16) The method of manufacturing a turbo compressor wheel according to (15), in which, as the small-diameter material that is subjected to the forging step, a material having an outer diameter which is 0.10 mm to 2.0 mm smaller than an inner diameter of a portion having a maximum diameter portion of a compressor wheel product to be obtained or an inner diameter of a portion corresponding to an end portion of a blade portion on a minimum diameter side of the compressor wheel product to be obtained in the forging die is used, and, in the forging step, the position of the small-diameter material with respect to the forging die is determined by an inner circumferential wall of a portion corresponding to the maximum diameter portion or an inner circumferential wall of a portion corresponding to the end portion of the blade portion on the minimum diameter side in the forging die and the small-diameter material is subjected to closed die forging.

(17) The method of manufacturing a turbo compressor wheel according to (15) or (16), in which, in the forging step, a plastic processing ratio is set to lower than 20% in a portion which is intended to serve as a blade root portion by means of a finishing processing and the plastic processing ratio is set to 20% or higher in a portion which is intended to serve as the blade portion by means of the finishing processing.

(18) The method of manufacturing a turbo compressor wheel according to any one of (15) to (17), in which, by means of the forging step, a forged material having a forged structure in which the average number of grain boundaries intersected in a circumferential direction seen on a transverse section orthogonal to the forging pressurization direction is minimized in a central portion and is maximized in an outer circumferential portion is obtained at a position half as high as a total height of the closed forging die in a direction along an axial direction thereof.

(19) The method of manufacturing a turbo compressor wheel according to any one of (15) to (18), in which, after the forging step and before the finish processing step, as the thermal treatment step, a solution treatment and an artificial aging hardening treatment after a stabilization treatment or a stabilization treatment are carried out.

(20) The method of manufacturing a turbo compressor wheel according to any one of (13) to (19), in which, as the aluminum alloy, an Al—Cu—Mg-based alloy is used.

(21) The method of manufacturing a turbo compressor wheel according to any one of (13) to (19), in which, as the aluminum alloy, an Al—Si eutectic alloy is used.

When a compressor wheel of a turbocharger is manufactured using the shaped component for an aluminum alloy turbo compressor wheel of the present invention, it is possible to obtain a compressor wheel which is excellent in terms of high-temperature strength and rigidity as a whole, simultaneously, is excellent in terms of a dynamic balance during a high-speed rotation, and furthermore, has diverse required characteristics and optimal performances suitable for desirable characteristics in individual portions. In addition, according to the method of manufacturing a turbo compressor wheel of the present invention, it is possible to actually manufacture a compressor wheel for an aluminum alloy turbocharger having the above-described excellent performances.

DETAILED DESCRIPTION OF THE INVENTION

Figure 1:
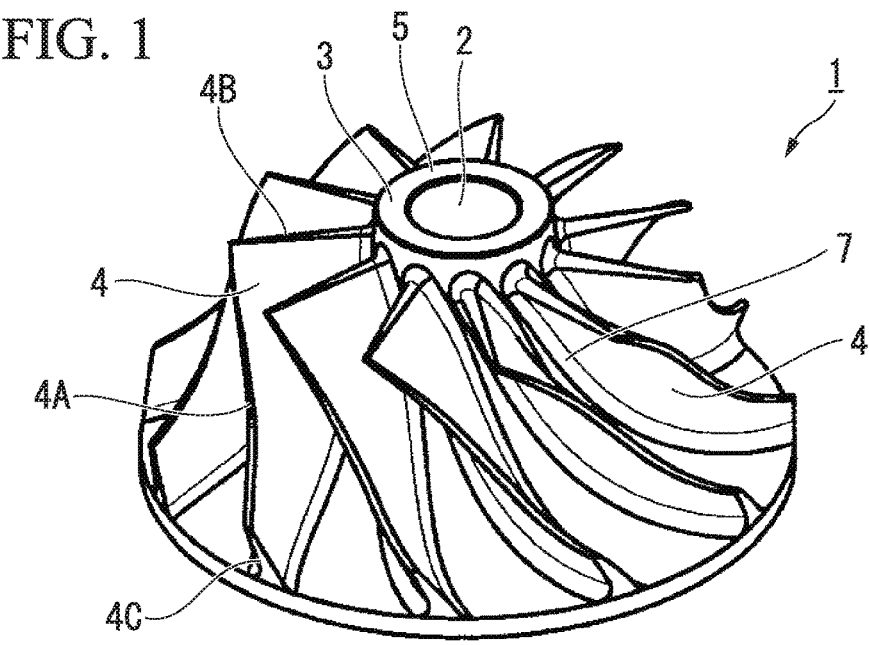
FIG. 1 is a perspective view schematically illustrating an example of a compressor wheel for a turbocharger.
Figure 2:
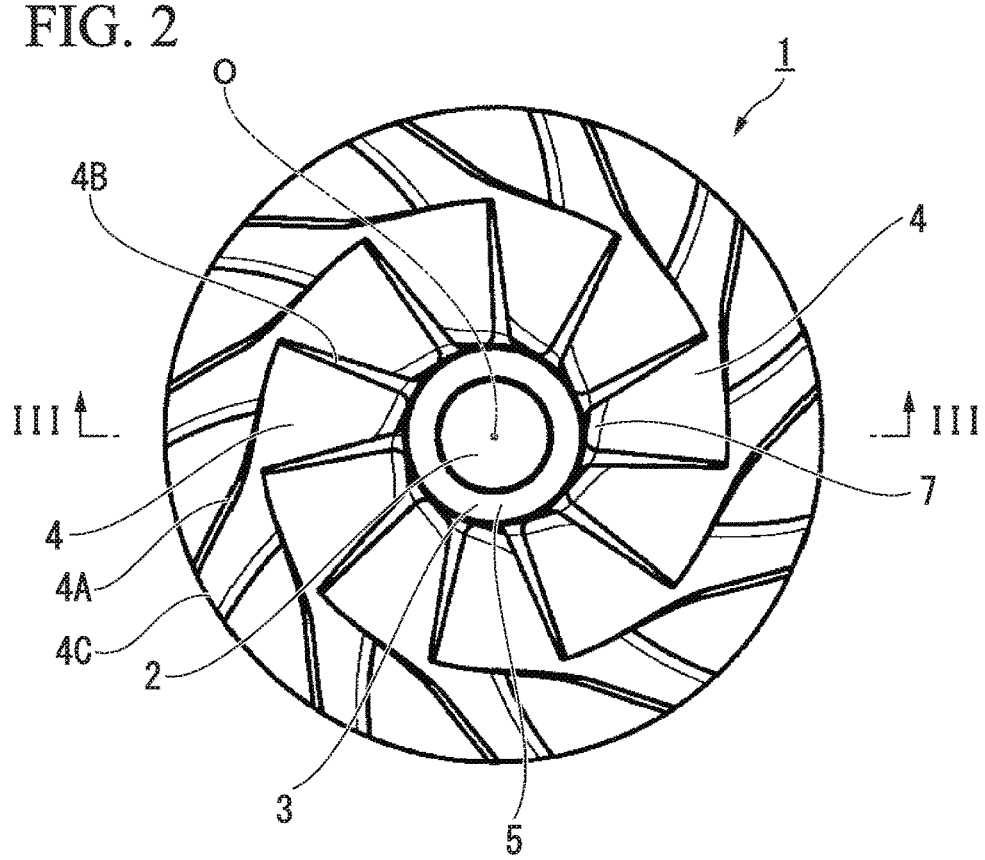
FIG. 2 is a plan view of the compressor wheel illustrated in FIG. 1.
Figure 3:
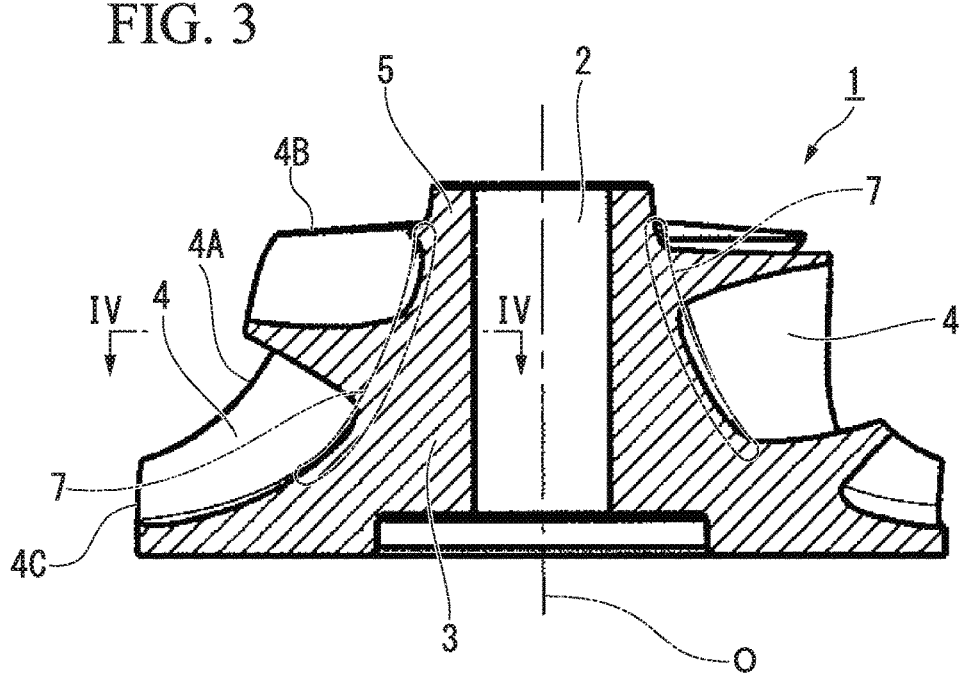
FIG. 3 is a vertical sectional view in the direction of the III-III line in FIG. 2.
Figure 4:
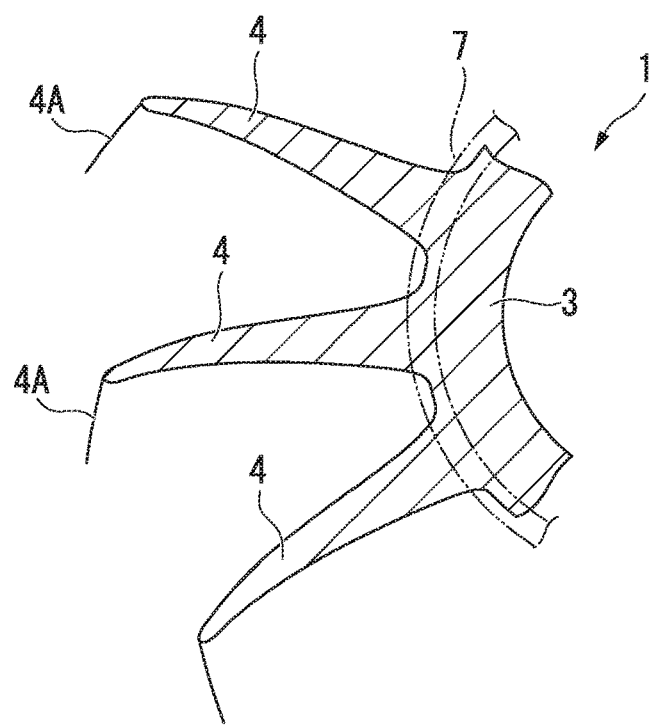
FIG. 4 is an enlarged transverse sectional view in the direction of the IV-IV line in FIG. 3.

Hereinafter, embodiments of a shaped component for an aluminum alloy turbo compressor wheel of the invention and a method of manufacturing a turbo compressor wheel will be described in detail with reference to the accompanying drawings. Meanwhile, the embodiments described below are simply examples, and it is needless to say that the present invention is not limited to these embodiments.

In addition, in the drawings that will be used in the following description, there are cases in which, in order for easy understanding of characteristics, for convenience purposes, characteristic portions are illustrated in an enlarged manner or non-characteristic portions are not illustrated, and the dimensional ratios and the like of individual constitutional elements are not always identical to those of actual elements. In addition, materials, dimension, and the like exemplified in the following description are simply examples, and the present invention is not limited thereto and can be carried out in an appropriately modified manner within the scope of the gist thereof.

First, an aluminum alloy used as a material for a shaped component for a turbo compressor wheel in the present invention will be described.

[Aluminum Alloy as Material]

In the present invention, the kind or component composition of a material alloy is not particularly limited as long as the material alloy is an aluminum alloy capable of satisfying general characteristics required for a compressor wheel such as high-temperature strength, rigidity, processability, and machinability; however, in a case in which a shaped component is produced by means of hot forging, it is desirable to select an aluminum alloy having excellent forgeability in addition to the above-described characteristics. In addition, in a case in which a manufacturing method of the present invention is applied, it is preferable to carry out a T6 treatment (solution treatment-artificial aging treatment) or a T7 treatment (solution treatment-stabilization treatment) as a thermal treatment after hot forging of a material, thereby increasing the strength, and thus it is desirable to select an aluminum alloy that is optimal for the above-described thermal treatment.

From the above-described viewpoint, the alloy as a material is optimally, for example, an Al—Si eutectic alloy, particularly, an "AHS" alloy (registered trademark) including an Al—Si—Cu—Mg-based alloy as a basic component or an Al—Cu—Mg-based alloy known as a so-called 2000-based alloy.

Meanwhile, the "AHS" is a registered trademark of Showa Denko K.K. for an aluminum alloy for high strength and high wear resistance use.

In addition, the 2000-based alloy refers to an alloy having an initial number of "2" in the 4-digit alloy number of Japan's JIS standards, USA's AA standards, Germany's DIN standards, and the like.

Next, each of the above-described aluminum alloys will be described in more detail.

<Al—Si Eutectic Alloy>

The Al—Si eutectic alloy represented by the "AHS" alloy is desirably an alloy which has eutectic Si grains crystallized in the matrix and contains, as a component composition thereof, Si: 9% to 12% (% by mass, which shall apply below), Cu: 3.5% to 4.5%, Mg: 0.4% to 0.8%, Fe: 0.15% to 0.3%, and Mn: 0.05% to 0.25% with a remainder consisting of Al and inevitable impurities.

The Al—Si eutectic alloy has a similar composition to that of an alloy (generally, an ADC 12 alloy of JIS standards) for a housing that surrounds a compressor wheel in a turbocharger, and thus the thermal expansion coefficient of the compressor wheel becomes identical to the thermal expansion coefficient of the housing. Therefore, the clearance (so-called tip clearance) of a narrow gap between the tip (tip edge portion) of the blade portion of the compressor wheel and the housing inner surface can be maintained constant, and thus the Al—Si eutectic alloy is optimal as a material for the compressor wheel. Meanwhile, in the Al—Si eutectic alloy represented by the "AHS" alloy, although eutectic Si grains crystallize in the matrix, the eutectic Si grains are fine, and furthermore, a continuous casting rod-shaped material having a small diameter is used as a material in the present invention, and thus, as will be described again later, the cast structure is miniaturized by means of rapid solidification. Therefore, the Al—Si eutectic alloy is excellent in terms of high-temperature strength, rigidity, fatigue strength, notch sensitivity, and the like, and thus the Al—Si eutectic alloy is also excellent as a material for the shaped component for a compressor wheel of the present invention from the above-described viewpoint.

The reasons for regulating the desired component composition of the Al—Si eutectic alloy that can be used as an alloy serving as the material in the present invention as described above are as described below.

Si:

Si is distributed in a eutectic Si form in the matrix, improves the rigidity, and coexists with Mg and thus precipitates $Mg_2Si$ grains, thereby improving the strength of an aluminum alloy. In addition, when eutectic Si grains are dispersed in the matrix, the property of scrapes being fragmented becomes favorable, and the machinability is improved. When the content of Si is lower than 9%, it becomes impossible to sufficiently obtain the above-described effects, and on the other hand, when the content of Si exceeds 12%, primary Si crystallizes and thus the forgeability degrades. Therefore, the content of Si is preferably set in a range of 9% to 12%. Meanwhile, the amount of Si is preferably in a range of 10% to 11% even in the range of 9% to 12%.

Meanwhile, for the eutectic Si grains, it is preferable that the average grain diameter thereof be 3 μm or smaller and the standard deviation of the grain diameter be 1 μm or smaller. When the average grain diameter of the eutectic Si grains exceeds 3 μm or the standard deviation of the grain diameter exceeds 1 μm, not only does the forgeability degrade, but there is also a concern that it may become impossible to obtain desired high-temperature strength, rigidity, fatigue strength, and notch sensitivity. Meanwhile, the average grain diameter of the eutectic Si grains is more preferably set in a range of 1.5 μm to 2 μm.

Meanwhile, here, the grain diameter of the eutectic Si grain being 3 μm or smaller or in a range of 1.5 μm to 2 μm means that the substantial grain diameter distribution is within this range and means, for example, 95% or more and preferably 98% or more of the eutectic Si grains out of all the eutectic Si grains measured from an approximately 400 times-magnified microscopic structure observation photograph using an image-processing method.

Fe:

Fe precipitates Al—Fe-based or Al—Fe—Si-based grains, miniaturizes recrystallized grains during hot forging, and thus enables the Al—Si eutectic alloy to be easily processed into a thin thickness and a fine shape in the blade portion and the like during the subsequent cutting (finish processing). When the content of Fe is lower than 0.15%, the above-described effect is small, and, when the content of Fe exceeds 0.3%, the number of Al—Fe-based or Al—Fe—Si-based coarse crystals increases and thus the forgeability degrades, and thus the amount of Fe is preferably in a range of 0.15% to 0.3%. Meanwhile, the amount of Fe is preferably set in a range of 0.15% to 0.25%.

Cu:

When Cu is added, Cu precipitates $CuAl_2$ particles and thus contributes to an improvement in the strength of an aluminum alloy. In order to obtain a sufficient strength improvement effect, it is desirable to add 3.5% or more of Cu, and on the other hand, when the content of Cu exceeds 4.5%, the forgeability degrades, and thus the content of Cu is preferably set in a range of 3.5% to 4.5%. Meanwhile, the content of Cu is more preferably set in a range of 3.8% to 4.2%.

Mg:

When Mg is added, Mg coexists with Si and thus precipitates $Mg_2Si$ grains, thereby contributing to an improvement in the strength of an aluminum alloy. When the amount of Mg is smaller than 0.4%, the strength improvement effect is small, and on the other hand, when the amount of Mg exceeds 0.8%, the forgeability degrades. Therefore, the amount of Mg is preferably in a range of 0.4% to 0.8%. Meanwhile, the amount of Mg is more preferably set in a range of 0.4% to 0.6%.

Mn:

When Mn is added, Mn precipitates Al—Mn-based or Al—Mn—Fe—Si-based grains, miniaturizes recrystallized grains during hot forging, improves the forging processability in the subsequent second forging (cold forging) step, and thus enables the Al—Si eutectic alloy to be easily processed into a thin thickness and a fine shape in the blade portion and the like during the subsequent cutting process (finish processing). When the content of Mn is lower than 0.05%, the above-described effect is small, and on the other hand, when the content of Mn exceeds 0.25%, the number of Al—Mn-based or Al—Mn—Fe—Si-based coarse crystals increases and thus the forgeability degrades, and thus the amount of Mn is preferably in a range of 0.05% to 0.25%. Meanwhile, the amount of Mn is more preferably set in a range of 0.05% to 0.1%.

Remainder:

In the Al—Si eutectic alloy, the remainder of the respective elements such as Si, Fe, Cu, Mg, and Mn may be, basically, Al and inevitable impurities, but may further contain, in addition to the above-described respective elements, one or more of Cr, Zr, and V together with inevitable impurities in a total amount of 2% or smaller in which the amount of each of Cr, Zr, and V is 0.1% or less. When these elements are added, the elements precipitate Al—Cr-based, Al—Cr—Fe—Si-based, Al—Zr-based, or Al—V-based grains, miniaturize recrystallized grains during hot forging, and thus enable the Al—Si eutectic alloy to be easily processed into a thin thickness and a fine shape in the blade portion and the like during the subsequent cutting (finish processing).

Furthermore, the Al—Si eutectic alloy may contain one or more of Ti: 0.01% to 0.3% (preferably 0.01% to 0.2% and more preferably 0.002% to 0.1%), B: 0.0001% to 0.05% (preferably 0.005% to 0.1%), and Sr: 0.001% to 0.2% (preferably 0.005% to 0.1% and more preferably 0.005% to 0.05%). When Ti and B are added, the structure of an ingot is miniaturized, the cracking of the ingot during casting is prevented, and it is possible to further improve the forgeability. In addition, when Sr is added, eutectic Si is miniaturized, and it is possible to improve the forgeability.

<Al—Cu—Mg-Based Alloy>

Meanwhile, in the present invention, in a case in which an Al—Cu—Mg-based alloy (2000-based alloy) is used as an alloy serving as the material, the Al—Cu—Mg-based alloy can be appropriately selected from alloys having a number of 2xxx regulated by JIS standards. AA standards, DIN standards, ISO standards, or the like, for example, JIS 2014 alloy, JIS 2017 alloy, JIS 2024 alloy. JIS 2218 alloy, and JIS 2618 alloy and alloys similar to the above-described standard alloys (which, basically, belong to the scope of an Al—Cu—Mg-based alloy but has component compositions that slightly deviate from those of the standard alloys). Among these, JIS 2618 alloy is a typical alloy for forging in an application in which high-temperature strength is required and, even in the present invention, can be preferably used as a material for a shaped component for a compressor wheel. In addition, an alloy (alloy B2 described below) obtained by changing the components (particularly, the contents of Ni and Cu) of the 2618 alloy can also be preferably used.

It is desirable to use an aluminum alloy including, as the specific component composition of this kind of Al—Cu—Mg-based alloy, Si: 0.1% to 0.8%, Cu: 1.8% to 4.5%. Mg: 1.2% to 2.0%, Fe: 0.18% to 1.5%, Mn: 0.05% to 1.2%, Ni: 0.05% to 1.5%, and a total of 2% or smaller of other inevitable impurities or additive elements in which the amount of each of the other inevitable impurities or the additive elements is 0.1% or less with a remainder being aluminum. Meanwhile, even in the above-described range, the amounts of Cu and Ni are preferably adjusted so that the total amount (Cu+Ni) of the Cu component and the Ni component falls in a range of 3.0% to 4.0°%.

Next, a desired component composition of the Al—Cu—Mg-based alloy that can be used as an alloy serving as the material in the present invention will be described.

Si:

Si is distributed in a eutectic Si form in the matrix, improves the rigidity, and coexists with Mg and thus precipitates $Mg_2Si$ grains, thereby improving the strength of an aluminum alloy. In order to obtain the above-described effect, the Al—Cu—Mg-based alloy needs to include 0.1% or more of Si. On the other hand, when the amount of Si exceeds 0.8%, the elongation degrades, and thus the forgeability degrades. Therefore, the amount of Si is preferably set in a range of 0.1% to 0.8%. Meanwhile, since Si is an element that contributes to dispersion strengthening at approximately 150° C., in a case in which the Al—Cu—Mg-based alloy is used at a temperature (for example, a temperature of approximately 200° C. or higher) higher than the application temperature in an ordinary turbocharger (approximately 150° C.), the amount of Si is desirably set in a range of 0.1% to 0.25%, and on the other hand, in a case in which the Al—Cu—Mg-based alloy is used at an ordinary application temperature of approximately 150° C.), the amount of Si is preferably in a range of 0.3% to 0.7%.

Cu:

When Cu is added, Cu precipitates $CuAl_2$ particles and thus contributes to an improvement in the strength of an aluminum alloy. In order to obtain a sufficient strength improvement effect, it is desirable to add 1.8% or more of Cu: meanwhile, when the content of Cu exceeds 4.5%, the forgeability degrades, and thus the content of Cu is preferably set in a range of 1.8% to 4.5%. Meanwhile, regarding the content of Cu, since Cu is an element that improves the strength at an application temperature (approximately 150° C.) in an ordinary turbocharger, and thus, as a material for a shaped component for a compressor wheel used at an application temperature (approximately 150° C.) in an ordinary turbocharger, the Al—Cu—Mg-based alloy desirably contains a relatively large amount of Cu, for example, in a range of 3.0% to 4.0% in terms of the balance with the content of Ni being regulated to be a small amount as described below (that is, from the viewpoint of compensating for a decrease in the strength due to the amount of Ni being regulated to be a small amount). Meanwhile, in the case of an application temperature that is approximately 200° C. or higher which is higher than the application temperature in an ordinary turbocharger, a large amount of Ni is contained as described below, and thus the amount of Cu is desirably a relatively small amount, for example, in a range of 1.9% to 2.7%.

Mg:

When Mg is added, Mg coexists with Si and thus precipitates $Mg_2Si$ grains, thereby contributing to an improvement in the strength of an aluminum alloy. When the amount of Mg is smaller than 1.2%, the strength improvement effect is small, and on the other hand, when the amount of Mg exceeds 2.0%, the forgeability degrades. Therefore, the amount of Mg is preferably in a range of 1.2% to 2.0%. Meanwhile, the amount of Mg is more preferably set in a range of 1.3% to 1.8%.

Fe:

Fe is a component that contributes to an improvement in the high-temperature strength, and, in order to improve the high-temperature strength, when the content of Fe is lower than 0.18%, a sufficient high-temperature strength improvement effect cannot be obtained, and, when the content of Fe is 1.5% or higher, excess Fe causes embrittlement, and cracking occurs during forging. Therefore, the amount of Fe is preferably set in a range of 0.18% to 1.5%. Meanwhile, in order to sufficiently improve the high-temperature strength, the amount of Fe is preferably set in a range of 0.8% to 1.3%.

Mn:

Mn is an element that increases the strength, and, when the amount of Mn is 0.05% or smaller, the strength improvement effect is small, and on the other hand, when the amount of Mg—Mn is 1.2% or larger, Fe—Mn-based crystals are generated, the toughness degrades, and the forgeability degrades. Therefore, the amount of Mn is set in a range of 0.05% to 1.2%.

Ni:

When Ni is added, there is an effect of improving the high-temperature strength, particularly, the strength at near 200° C. or in a temperature region that is 200° C. or higher due to the dispersion strengthening of an Al—Ni compound. When the amount of Ni is smaller than 0.05%, the strength improvement effect of the addition of Ni is not obtained, and on the other hand, when the amount of Ni exceeds 1.5%, the toughness degrades, and thus the amount of Ni is preferably in a range of 0.05% to 1.5%. Meanwhile, the addition of Ni is effective for improving the strength at approximately 200° C. or higher; however, when the amount of Ni increases, conversely, the strength decreases at the application temperature (approximately 150° C.) in an ordinary turbocharger, and thus, in a material for a shaped component for a compressor wheel used at the application temperature (approximately 150° C.) in an ordinary turbocharger, the content of Ni is preferably regulated to be a small amount. In this case, it is desirable that the amount of Ni be regulated to be 0.3% or smaller and more preferably 0.1% or smaller. On the other hand, in the case of an application temperature that is approximately 200° C. or higher which is higher than the application temperature in an ordinary turbocharger, it is desirable to add a relatively large amount of Ni, for example, in a range of 0.9% to 1.2%.

Remainder:

In the Al—Cu—Mg-based alloy, the remainder of the respective elements such as Si, Cu, Mg, Fe, Mn, and Ni may be, basically, Al and inevitable impurities, but may further contain, in addition to the above-described respective elements, one or more of Cr, Zr, and V together with inevitable impurities in a total amount of 2% or smaller in which the amount of each of Cr, Zr, and V is 0.1% or less. When these elements are added, the elements precipitate Al—Cr-based, Al—Cr—Fe—Si-based, Al—Zr-based, or Al—V-based grains, miniaturize recrystallized grains during hot forging, and thus enable the Al—Si eutectic alloy to be easily processed into a thin thickness and a fine shape in the blade portion and the like during the subsequent cutting (finish processing).

Cu+Ni:

Meanwhile, in the Al—Cu—Mg-based alloy, the amount of Cu and the amount of Ni are preferably adjusted so that the total amount (Cu+Ni) of the amount of Cu and the amount of Ni falls in a range of 3.0% to 4.0%. When (Cu+Ni) is within this range, it is possible to produce an alloy having a superior balance between processability, forgeability, and strength.

Furthermore, the Al—Cu—Mg-based alloy may contain one or more of Ti: 0.01% to 0.3% (preferably 0.01% to 0.2% and more preferably 0.002% to 0.1%), B: 0.0001% to 0.05% (preferably 0.005% to 0.1%), and Sr: 0.001% to 0.2% (preferably 0.005% to 0.1% and more preferably 0.005% to 0.05%). When Ti and B are added, the structure of an ingot is miniaturized, the cracking of the ingot during casting is prevented, and it is possible to further improve the forgeability. In addition, when Sr is added, eutectic Si is miniaturized, and it is possible to improve the forgeability.

Here, when the above-described difference in the component composition of the Al—Cu—Mg-based alloy caused by the application temperature in a turbocharger is taken into account, in the case of an ordinary application temperature of approximately 150° C., it is desirable to select an aluminum alloy (hereinafter, referred to as "Alloy B2") including Si: 0.3% to 0.7%. Fe: 0.18% to 0.3%, Cu: 3.0% to 4.0%, Mg: 1.3% to 1.8%. Mn: 0.6% to 1.2%, and Ti: 0.01% to 0.05% with the content of Ni regulated to be 0.3% or lower or 0.1% or lower; meanwhile, in a case in which the Al—Cu—Mg-based alloy is assumed to be used at a relatively high temperature (for example, approximately 200° C. or higher), it is desirable to select an alloy having a component composition corresponding to that of the 2618 alloy, that is, an aluminum alloy (hereinafter, referred to as "Alloy B1") including Si: 0.1% to 0.25%, Fe: 0.9% to 1.3%, Cu: 1.9% to 2.7%, Mg: 1.3% to 1.8%, Mn: 0.05% to 0.25%. Ni: 0.9% to 1.2%, and Ti: 0.04% to 0.1%.

[Outline of Basic Constitution of Shaped Component]

The shaped component for a turbo compressor wheel of the present invention may be a shaped component made of a continuous casting rod-shaped material having a small diameter or a shaped component made of a forged material (forging-completed material) obtained by carrying out hot closed die forging on the continuous casting rod-shaped material having a small diameter as a material for forging.

In a case in which the former continuous casting rod-shaped material having a small diameter is used to produce a shaped component, the continuous casting rod-shaped material maintains the shape of a small-diameter rod-shaped material obtained by means of continuous casting (here, generally, a rod-shaped material cut into a short length that is as long as one compressor wheel) before a rough processing. In addition, as machining, for example, a rough processing such as turning is carried out on the short small-diameter rod-shaped material, and the rod-shaped material is processed into almost a circular top-truncated conical shape or a bell shape, thereby producing a shaped component for a compressor wheel. Furthermore, in order to actually complete the shaped component in the shape of a compressor wheel, as machining, for example, a finish processing such as cutting is carried out, thereby forming a blade portion or a boss hole.

Figure 5:
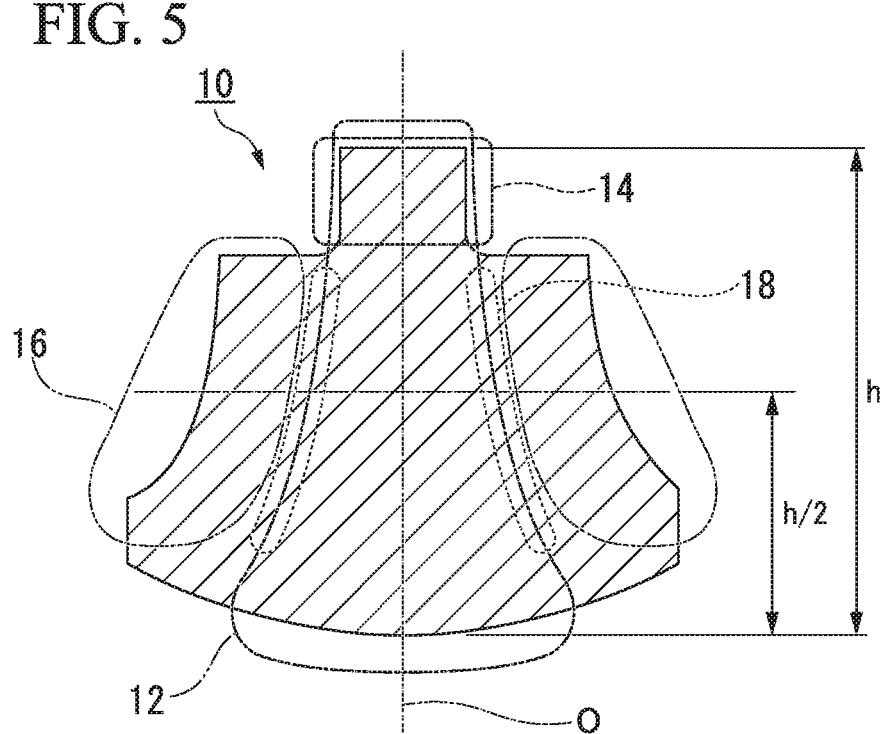
FIG. 5 is a vertical sectional view illustrating an example of a shaped component for an aluminum alloy turbo compressor wheel according to the present invention, particularly, an example of a shaped component made of a forging-completed material.

On the other hand, in a case in which the latter forged material is used to produce a shaped component, for example, as illustrated in FIG. 5, forging is carried out so that the overall shape of the forging-completed material becomes a circular top-truncated conical shape or a bell shape corresponding to a compressor wheel (refer to FIGS. 1 to 4). That is, the forged material is produced so as to have a rotary body shape that is axially symmetric with respect to the rotation central line axis O of the compressor wheel and have an outer circumferential surface shape that is slightly larger than the outer shape of the compressor wheel. Meanwhile, the details of a shaped component (forging-completed material) 10 produced by means of forging, which is illustrated in FIG. 5, will be described in detail in the section of the manufacturing method below. Even in a case in which the above-described shaped component (forging-completed material) produced by means of forging is used, in order to actually complete the shaped component in the shape of the compressor wheel, a finish processing such as cutting is carried out.

The details of the above-described processes of continuous casting, forging, and furthermore, the finish processing will also be described again in detail in the section of the manufacturing method below.

[Structure of Continuous Casting Rod-Shaped Material as Shaped Component for Turbo Compressor Wheel (or Material for Forging)]

In the shaped component or the material for forging made of the continuous casting rod-shaped material having a small diameter, the casting direction (therefore, the longitudinal direction of the material) is along the rotational center axis line direction of the compressor wheel. In addition, the shaped component or the material for forging has a cast structure in which the average number of grain boundaries intersected in the circumferential direction seen on a transverse section orthogonal to the casting direction is minimized in the central portion of the transverse section and is maximized in the outer circumferential portion.

Figure 6:
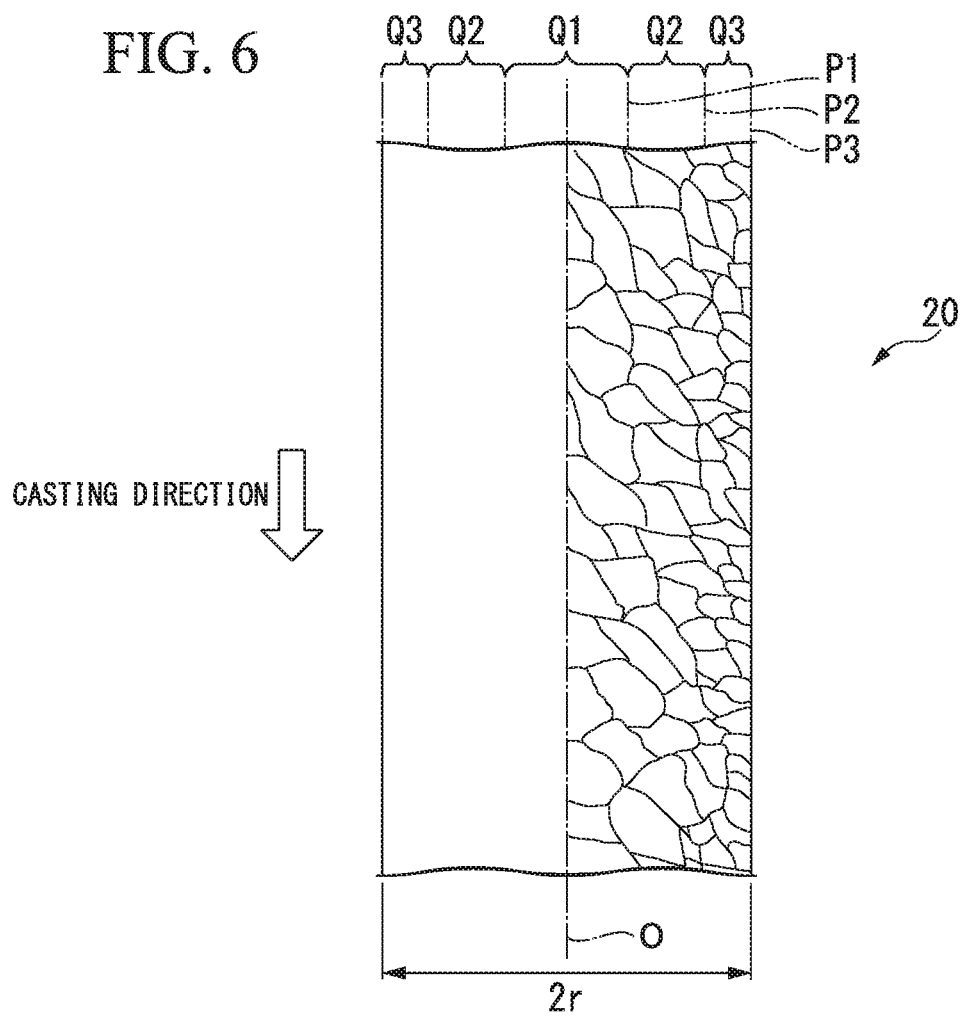
FIG. 6 is a schematic view illustrating an example of a structure in a vertical section along a casting direction in a continuous casting rod-shaped material having a small diameter used as a material in the present invention.
Figure 7:
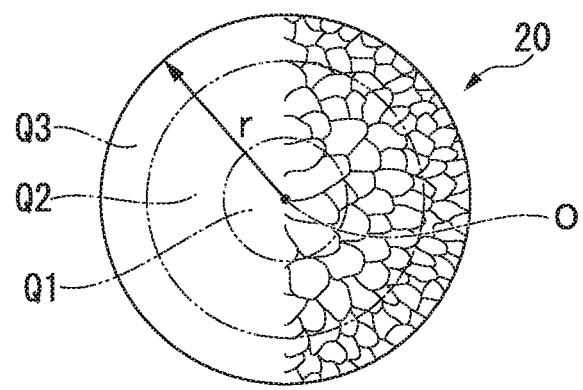
FIG. 7 is a schematic view illustrating an example of a structure in a transverse section orthogonal to the casting direction in the continuous casting rod-shaped material having a small diameter used as the material in the present invention.

The structure on a section of a continuous casting rod-shaped material 20 having a small diameter used to produce a compressor wheel shaped component (or the material for forging) will be schematically illustrated in FIGS. 6 and 7.

With continuous casting in a small diameter, it becomes possible to obtain a rod-shaped material (cylindrical rod) which is not only highly productive but also has a fine cast structure and does not easily allow segregation. Furthermore, in the rod-shaped material 20 obtained by means of continuous casting, since the metal structure (cast structure) thereof becomes an equiaxed grain structure that radially extends to be long and fine in the outer diameter direction from the center of the cylindrical axis of the rod-shaped material 20, crystal grain boundaries are almost uniformly distributed in the circumferential direction, and the grain boundary density in the circumferential direction becomes uniform. The crystal grain boundary refers to a place in which a transition metal such as Fe, Ni, or Mn segregates, and thus the density distribution (sparseness and denseness) of the grain boundaries has an influence on the sparseness and denseness of the material and thus also has an influence on the weight balance in the circumferential direction. When the continuous casting rod-shaped material has a uniform grain boundary density in the circumferential direction, the material becomes excellent in terms of the dynamic balance during a high-speed rotation which is required for the compressor wheel. In addition, the density distribution (sparseness and denseness) of the grain boundaries on a transverse section in a cylindrical rod-shaped material can be evaluated using the average numbers of grain boundaries intersected in the circumferential direction in individual portions in the radial direction, and thus, herein, the sparseness and denseness of the structure in the radial direction is regulated using the average number of grain boundaries intersected in the circumferential direction.

Figure 8:
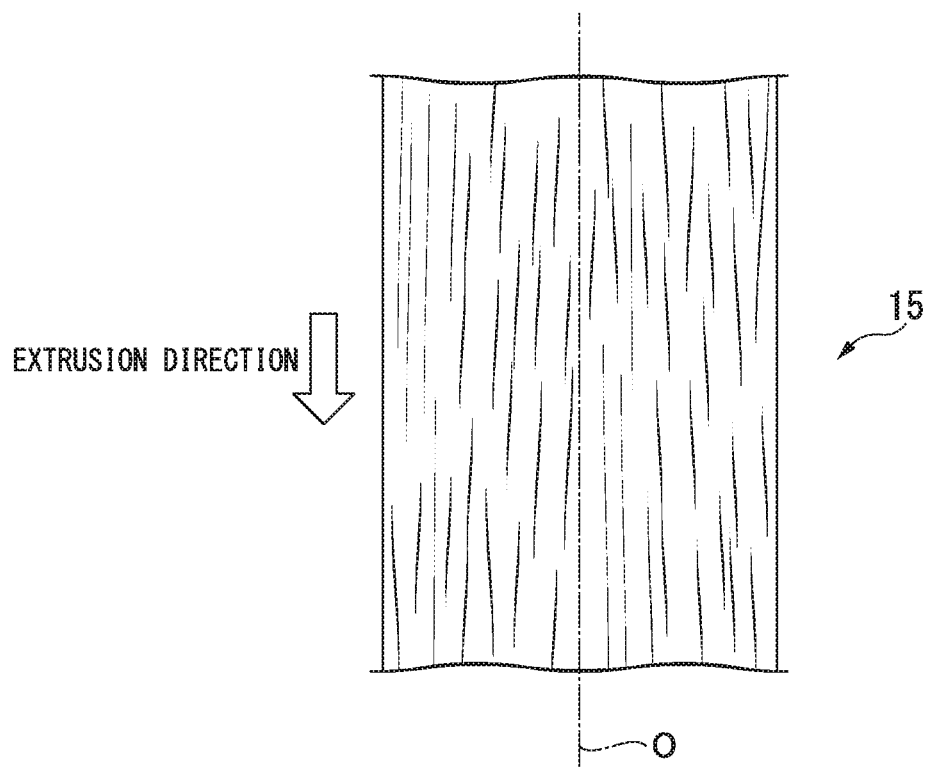
FIG. 8 is a schematic view illustrating an example of a structure in a vertical section along an extrusion direction in an extruded material of a material for forging regarding a method of the related art in which the extruded material is used as a material for forging.

Meanwhile, in the case of a shaped component obtained by means of an extrusion method of the related art, since the structure of an extruded shaped component 15 is extended to be long in a fibrous shape in the extrusion direction as schematically illustrated in FIG. 8, the difference in the structure in the extrusion direction and a direction orthogonal thereto is extremely large. Therefore, even after the extruded material is forged, the influence of the structural difference depending on the directions of the extruded material significantly remains, and there is a strong concern that the mechanical characteristics also vary depending on directions: however, in the equiaxed grain structure of the continuous casting rod-shaped material, the difference in the structure in the extrusion direction and a direction orthogonal thereto is far smaller compared with that in the extruded material, and thus it is possible to suppress the variation (anisotropy) of the mechanical characteristics depending on directions at a relatively small level.

Here, when the structure of the continuous casting rod-shaped material having a small diameter obtained by means of rapid solidification is observed in more detail, the molten alloy is rapidly cooled from the outer circumferential surface side on which the molten alloy comes into contact with the inner surface of a mold and begins to be rapidly solidified from the outer circumferential surface side, and thus, as schematically illustrated in FIGS. 6 and 7, in an outer circumferential portion Q3, a structure is formed in which grain diameters are small (that is, a dense structure), and, since the solidification rate becomes slightly slow as the continuous casting rod-shaped material is solidified toward the center, in the central portion Q1, a structure is formed in which grain diameters are relatively larger (that is, a sparse structure). Meanwhile, FIGS. 6 and 7 illustrate the sizes of crystal grains in an exaggerated manner compared with actual crystal grains in order for easy understanding.

Figure 9:
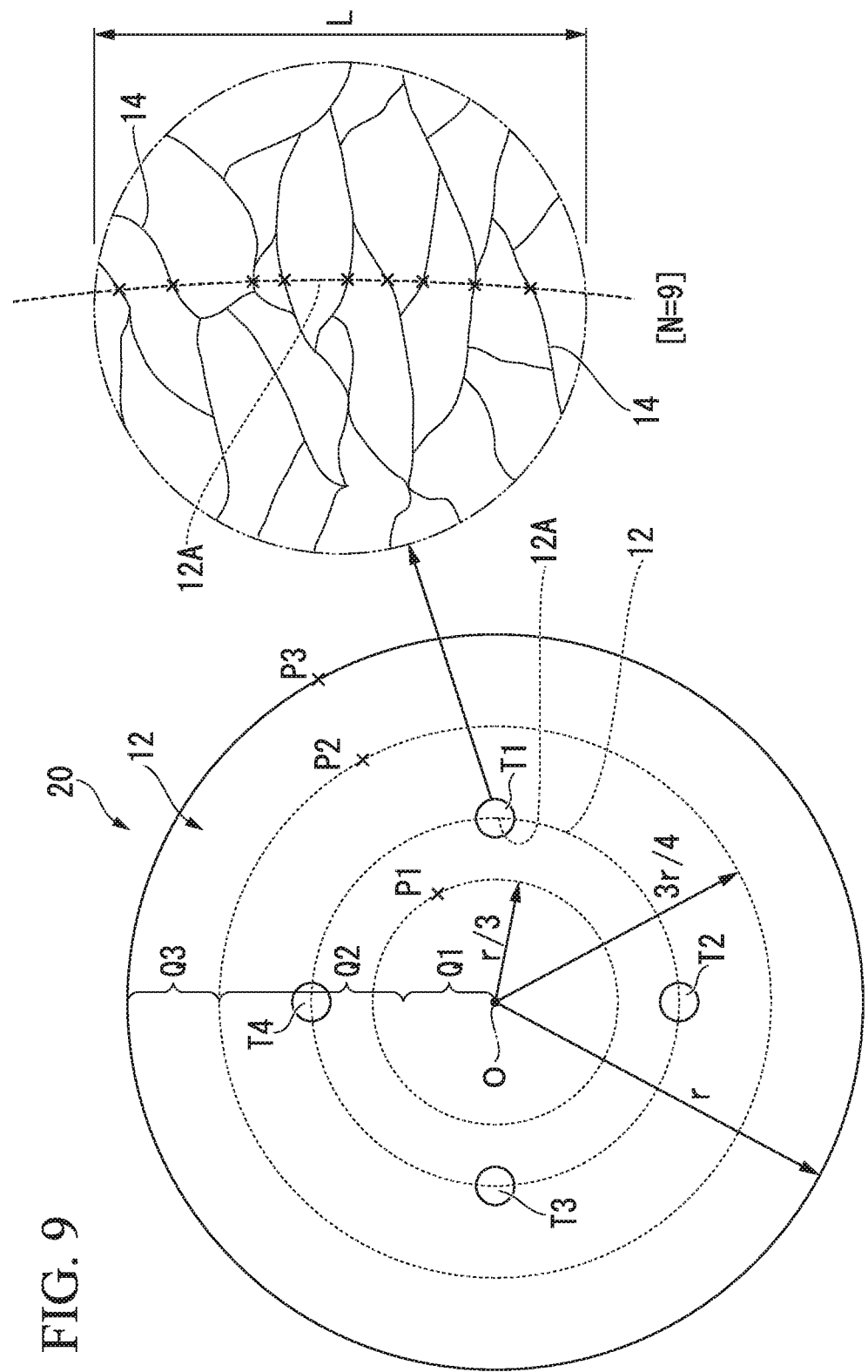
FIG. 9 is a schematic view for describing the structure in the transverse section orthogonal to the casting direction in the continuous casting rod-shaped material used as the material in the present invention.

Here, the central portion Q1 on the transverse section of the material (the continuous casting rod-shaped material having a small diameter) 20 refers to, for example, a circular area Q1 reaching a position P1 having a radius (r/3) that is a third of the material radius r from the central position O of the transverse section on the transverse section orthogonal to the casting direction as schematically illustrated in the left side of FIG. 9. In addition, the outer circumferential portion refers to, for example, an area Q3 from a position P2 having a radius (3r/4) that is three fourths of the material radius r from the central position O of a material transverse section 12 to an outer circumferential edge position P3. Meanwhile, an area Q2 refers to an area between the central portion area Q1 and the outer circumferential portion area Q3.

In addition, the average number of grain boundaries intersected in the circumferential direction (C) in the material (the continuous casting rod-shaped material having a small diameter) 20 is defined as the average value of values (N/L) obtained by dividing the number N of places at which a portion (arc) 12A having a length of L on a circumference intersect grain boundaries 14 (the intersection points marked by X in the enlarged view on the right side of FIG. 9) (N=9 in the example of FIG. 9) by the circumferential direction length L of the arc 12A on the circumference when circles (concentric circles; for example, a circle having a reference sign 12) are drawn around the central position O on a transverse section orthogonal to the casting direction of the material 20 as illustrated in FIG. 9. That is, on the above-described circle 12, a plurality of views having a circumferential length L T1, T2, T3, and T4 is selected at equal intervals (in the example of FIG. 9, four views at 90° intervals), the numbers of places intersected by the arc 12A (grain boundary-intersected places X) N1, N2, N3, and N4 are counted in the respective views, and a value obtained by dividing the total number by the total arc length (4 L for the four views) becomes the average number of grain boundaries intersected in the circumferential direction.

That is, in this example, the average number of grain boundaries intersected in the circumferential direction (C) is represented by $$C=(N1+N2+N3+N4)/4L.$$

Meanwhile, the above-described average numbers of grain boundaries intersected in the circumferential direction (C) in the outer circumference portion and the central portion may be determined using measurement values in circles at positions of typical places (radii) in the respective areas Q1, Q2, and Q3, and, for example, in examples described below, a value measured on a circumference having a radius of 2 mm from the center is used as the value in the central portion, and a measurement value on a circumference at a position 2 mm inside from the outer circumferential surface in the radial direction is used as the value in the outer circumferential portion, and, in actual cases, a measurement at the above-described typical position is sufficient to determine the number.

Furthermore, in a case in which higher accuracy is required, for each of the areas (Q1, Q2, and Q3), the average number of grain boundaries intersected in the circumferential direction may be determined by drawing a plurality of concentric circles (a plurality of sample circles; desirably 3 or more sample circles) at equal intervals in the radial direction in the area, measuring the average numbers C of grain boundaries intersected in the circumferential direction in the respective circles, and using the averaged value (simple average value) for the area. For example, the sparseness and denseness status of the cast structure (the sparseness and denseness status of grain boundaries) on a transverse section of the material (the continuous casting rod-shaped material having a small diameter) 20 may be determined by drawing three concentric circles at equal intervals in the radial direction in each of the areas Q1, Q2, and Q3 (including the position of a boundary circle with another area adjacent thereto), obtaining the average numbers C1 to C3 of grain boundaries intersected in the circumferential direction in these three concentric circles, and furthermore, using the average value Cav thereof, that is, $$Cav=(C1+C2+C3)/3.$$

Actually, when the average number of grain boundaries intersected in the circumferential direction, that is, the sparseness and denseness status of grain boundaries is measured, the number of grain boundaries intersected by an arc on a concentric circle on a transverse section of the continuous casting rod-shaped material having a small diameter may be measured by observing the transverse section using a metal microscope after an etching treatment for metal structure observation is carried out on the transverse section so as to adjust the transverse section to make grain boundaries observable, or the number of grain boundaries intersected by an arc on a concentric circle on a transverse section of the continuous casting rod-shaped material having a small diameter may be measured by obtaining an image of the etched transverse section by means of photography or the like and carrying out a binarization treatment or the like as necessary on the image.

Here, the reason for the continuous casting rod-shaped material having a small diameter being regulated to have a cast structure in which the average number of grain boundaries intersected in the circumferential direction seen on a transverse section orthogonal to the casting direction is minimized in the central portion of the transverse section and is maximized in the outer circumferential portion as described above is as described below.

That is, the central portion corresponding to the area Q1 reaching the position P1 having a radius (r/3) that is a third of the material radius r from the central position O on the transverse section orthogonal to the casting direction is a portion corresponding to the rotary shaft portion and the blade root portion in the compressor wheel, and the circumferential portion corresponding to the area Q3 from the position P2 having a radius (3r/4) that is three fourths of the material radius r from the central position O to the outer circumferential edge position P3 is a portion corresponding to the blade portion in the compressor wheel.

In addition, a small average number of grain boundaries intersected in the circumferential direction in the place corresponding to the blade root portion in the central portion, that is, a relatively sparse structure is effective for improving the notch fatigue strength of the blade root portion. That is, a small number of grain boundaries which serve as a starting point of notch fatigue failure in the blade root portion in which stress concentrates during the high-speed rotation of the compressor wheel contribute to the improvement in the notch fatigue strength. In addition, a place on one end side of the rotary shaft portion of the compressor wheel serves as a boss portion into which a shaft is pressure-fitted, and a small average number of grain boundaries intersected in this portion, that is, a relatively sparse structure suppresses the generation of cracks during the pressure-fitting of a shaft.

On the other hand, a larger average number of grain boundaries intersected in the circumferential direction in the place corresponding to the blade portion in the outer circumferential portion, that is, a relatively dense structure contributes to the improvement in the strength and the rigidity of the thin blade portion in the compressor wheel which rotates at high speed.

As described above, when the continuous casting rod-shaped material is sparse and dense in the radial direction as regulated above, it is possible to satisfy diverse required performances in the respective portions of the compressor wheel.

That is, when the continuous casting rod-shaped material is provided with a cast structure which is sparse and dense in the radial direction as regulated above, it is possible to obtain a structure in which the average number of grain boundaries intersected in the circumferential direction in a portion which is intended to serve as the blade root portion in the turbo compressor wheel is smaller than the average number of grain boundaries intersected in the circumferential direction in a portion which is intended to serve as the blade portion in the turbo compressor wheel, which is on the outer circumferential side of the blade root portion, and thus it becomes possible to respectively satisfy diverse performances required in the blade root portion and the blade portion in the turbo compressor wheel.

Meanwhile, the ratio (Nout/Nin) between the average number Nout of grain boundaries intersected in the circumferential direction in the outer circumferential portion and the average number Nin of grain boundaries intersected in the circumferential direction in the central portion is preferably in a range of 1.3 to 10. When the ratio (Nout/Nin) is smaller than 1.3, the difference of the sparseness and denseness of the structure in the radial direction on the transverse section is not sufficient, and thus there is a concern that it may become impossible to sufficiently satisfy diverse required performances in the respective portions of the above-described compressor wheel. Meanwhile, for actual continuous casting rod-shaped materials that are used to manufacture compressor wheels having a diameter (approximately 150 mm or smaller) which is the subject of the present invention, the ratio (Nout/Nin) exceeding 10 is not a common case, and, when the ratio (Nout/Nin) exceeds 10, although it is possible to satisfy the diverse required characteristics in the respective portions, the structural difference between the central portion and the outer circumferential portion becomes significantly great, and consequently, there are cases in which strength, processability or forgeability, toughness, and the like are adversely influenced depending on places.

Meanwhile, the specific value of the average number of grain boundaries intersected in the circumferential direction also varies depending on the casting rate during continuous casting, the cooling conditions, the cast diameter, the component composition of an alloy, and the like, and, although it is not possible to say that the following fact is always true, in a case in which the casting rate is 150 mm/minute or higher, and the outer diameter is 25 mm or larger and 120 mm or smaller, the average number of grain boundaries intersected in the circumferential direction is generally in a range of approximately 0.5 to 10 in an Al—Si eutectic alloy and in a range of approximately 1 to 30 in an Al—Cu—Mg alloy, and, generally, in the above-described range, the average number of grain boundaries intersected in the circumferential direction differs in the central portion and the outer circumferential portion of the continuous casting rod-shaped material.

Hitherto, an aspect in which the continuous casting rod-shaped material having a small diameter is used as a material and the shaped component for a compressor wheel is produced by means of machining (a rough processing) alone without carrying out a plastic process such as forging on the material has been described.

However, in the present invention, a material obtained by further carrying out hot closed die forging on the above-described continuous case rod-shaped material having a small diameter may also be used as the shaped component for a compressor wheel. In this case as well, when the continuous casting rod-shaped material (the material for forging) satisfies the above-described sparseness and denseness conditions of the structure in the radial direction on the transverse section, the influence of this fact still remains in a forging-completed material, and it becomes possible to easily obtain an appropriate structure for the forging-completed material (the shaped component for a compressor wheel).

[Structure of Forged Material as Shaped Component for Turbo Compressor Wheel]

In a case in which a material obtained by further carrying out hot closed die forging on the above-described continuous case rod-shaped material having a small diameter is used as the shaped component for a compressor wheel as well, for the continuous casting rod-shaped material serving as a material for forging, similar to what has been described above, the casting direction (therefore, the longitudinal direction of the continuous casting rod-shaped material) is set to be along the rotational center axis line direction of the compressor wheel. In addition, it is desirable to use a material having a cast structure in which the average number of grain boundaries intersected in the circumferential direction seen on a transverse section orthogonal to the casting direction is minimized in the central portion of the transverse section and is maximized in the outer circumferential portion. In such a case, for the continuous casting rod-shaped material serving as a material for forging, similar to what has been described above, it is possible to obtain a cast structure in which the average number of grain boundaries intersected in the circumferential direction in a portion which is intended to serve as the blade root portion in the turbo compressor wheel is smaller than the average number of grain boundaries intersected in the circumferential direction in a portion which is intended to serve as the blade portion in the turbo compressor wheel, which is on the outer circumferential side of the blade root portion.

Meanwhile, the ratio (Nout/Nin) between the average number Nout of grain boundaries intersected in the circumferential direction in the outer circumferential portion of the continuous casting rod-shaped material and the average number Nin of grain boundaries intersected in the circumferential direction in the central portion is preferably, similar to what has been described above, in a range of 1.3 to 10. In addition, the definition of the outer circumferential portion and the central portion of the continuous casting rod-shaped material, the definition of the average number of grain boundaries intersected in the circumferential direction, and the measurement method thereof are as described above. Furthermore, the forging rate during continuous casting and the diameter of the cast rod-shaped material also desirably satisfy the above-described conditions.

In forging, the material for forging made of the continuous casting rod-shaped material having a small diameter is forged in a state of being disposed in a closed die so that the forging pressurization direction becomes along the casting direction of the material and along the rotational center axis line direction of the compressor wheel.

Here, similar to the conditions regulated for the continuous casting rod-shaped material, the forging-completed material also desirably has a forged structure in which the average number of grain boundaries intersected in the circumferential direction seen on a transverse section orthogonal to the forging pressurization direction is minimized in the central portion and is maximized in the outer circumferential portion. Here, the average number of grain boundaries intersected in the circumferential direction is observed at a position half as high as the total height of the forging-completed material in a direction along the axial direction on a transverse section orthogonal to the forging pressurization direction as described again below in detail in the section of the manufacturing method. In addition, the ratio (Nout/Nin) between the average numbers of grain boundaries intersected in the circumferential direction in the central portion and in the outer circumferential portion at the above-described half-height position is also preferably in a range of 1.3 to 10 similar to that of the above-described continuous casting rod-shaped material.

Meanwhile, the definition of the outer circumferential portion and the central portion of the forging-completed material, the definition of the average number of grain boundaries intersected in the circumferential direction, and the measurement method thereof are the same as those for the continuous casting rod-shaped material described above.

As described above, when the forging-completed material has a forged structure in which the average number of grain boundaries intersected in the circumferential direction seen on a transverse section orthogonal to the forging pressurization direction is minimized in the central portion and is maximized in the outer circumferential portion at the position half as high as the total height in a direction along the axial direction, the following effect is obtained.

In the forging-completed material, a small average number of grain boundaries intersected in the circumferential direction at the place corresponding to the blade root portion in the central portion, that is, a relatively sparse structure is effective for improving the notch fatigue strength of the blade root portion. That is, a small number of grain boundaries which serve as a starting point of notch fatigue failure in the blade root portion in which stress concentrates during the high-speed rotation of the compressor wheel contribute to the improvement in the notch fatigue strength. In addition, a place on one end side of the rotary shaft portion of the compressor wheel serves as a boss portion into which a shaft is pressure-fitted, and a small average number of grain boundaries intersected in this portion, that is, a relatively sparse structure suppresses the generation of cracks during the pressure-fitting of a shaft.

On the other hand, a large average number of grain boundaries intersected in the circumferential direction in the place corresponding to the blade portion in the outer circumferential portion of the forging-completed material, that is, a relatively dense structure contributes to the improvement in the strength and the rigidity of the thin blade portion in the compressor wheel which rotates at high speed.

As described above, when the structure of the forging-completed material as the shaped component for a compressor wheel on the transverse section at a position of the above-described height satisfies the sparseness and denseness conditions as regulated above in the radial direction, it is possible to satisfy diverse required performances in the respective portions of the compressor wheel.

In other words, when the average numbers of grain boundaries intersected in the circumferential direction in the central portion and in the outer circumferential portion at a half-height position of in the forging-completed material are differed, it is possible to obtain a structure in which the average number of grain boundaries intersected in the circumferential direction seen on a transverse section orthogonal to the forging pressurization direction at the half-height position in a portion which is intended to serve as the blade root portion in the turbo compressor wheel is smaller than the average number of grain boundaries intersected in the circumferential direction seen on a transverse section orthogonal to the forging pressurization direction at the half-height position in a portion which is intended to serve as the blade portion in the turbo compressor wheel, which is on the outer circumferential side of the blade root portion, and thus it becomes possible to respectively satisfy diverse required performances of the blade root portion and the blade portion in the turbo compressor wheel.

[Method of Manufacturing Turbo Compressor Wheel]

Next, a preferred aspect and preferred conditions of an overall process from a phase for manufacturing the shaped component for a turbo compressor wheel through, furthermore, the completion of a turbo compressor wheel will be described.

<Summary of Overall Manufacturing Method>

The shaped component for a turbo compressor wheel of the present invention may be a continuous casting rod-shaped material having a small diameter or a forged material obtained by carrying out hot closed die forging on the continuous casting rod-shaped material having a small diameter.

Figure 10:
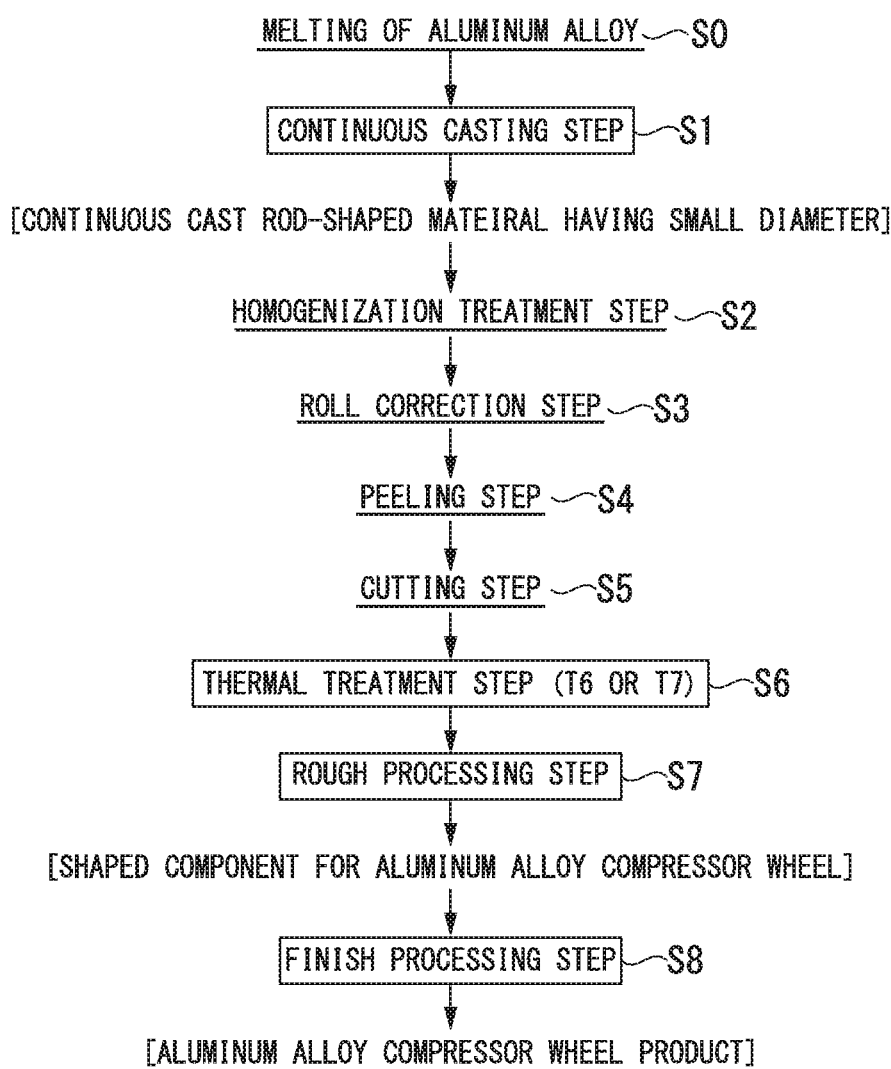
FIG. 10 is a flowchart illustrating a first embodiment of a method of manufacturing a turbo compressor wheel of the present invention.

That is, in the former case, a continuous casting rod-shaped material having a small diameter obtained by means of continuous casting is used as a shaped component and is subjected to, for example, processes as illustrated in FIG. 10, thereby completing a compressor wheel. That is, an aluminum alloy as described above is melted (S0), and a continuous casting rod-shaped material having a small diameter is obtained by means of a continuous casting step (S1). Furthermore, a homogenization treatment is carried out as necessary (homogenization treatment step S2), then, the continuous casting rod-shaped material is subjected to a correction step (S3) in which a roll is used, a peeling step (S4), and a cutting step (S5) as necessary, a thermal treatment (S6) such as a T6 treatment or a T7 treatment suitable for the type of the alloy is carried out as necessary, and furthermore, a shaped component for an aluminum alloy compressor wheel is obtained by means of a rough processing step (S7) in which the continuous casting rod-shaped material is machined into a shaped component shape. A finish processing (S8) in which the shaped component is completed in the shape and dimension of the final product (compressor wheel) by means of machining such as cutting is carried out on the shaped component, and finally, the shaped component is made into an aluminum alloy compressor wheel for a turbocharger.

Figure 11:
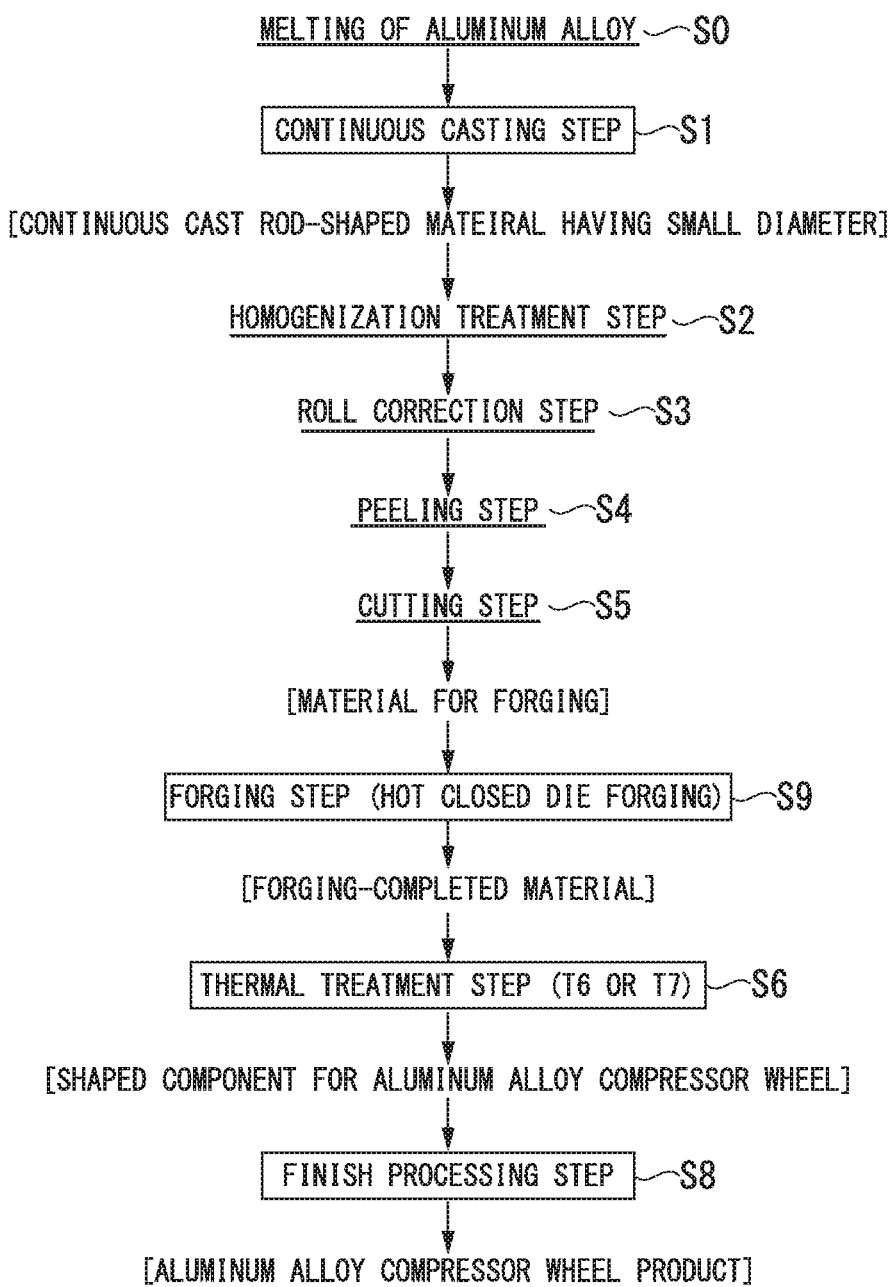
FIG. 11 is a flowchart illustrating a second embodiment of the method of manufacturing a turbo compressor wheel of the present invention.

In addition, in the latter case, for example, as illustrated in FIG. 11, a continuous casting rod-shaped material having a small diameter obtained by means of continuous casting is used as a shaped component, hot closed die forging (S9) is carried out thereon, and the thermal treatment (S6) such as the T6 treatment or the T7 treatment suitable for the type of the alloy is carried out on the obtained forging-completed material, thereby producing a shaped component for a compressor wheel. Furthermore, the finish processing (S8) in which the shaped component is completed in the shape and dimension of the final product (compressor wheel) by means of machining such as cutting is carried out on the shaped component, thereby completing a compressor wheel product. Here, the former processes and the latter processes are substantially the same as each other except for the provision of the hot closed die forging step (S9) in the middle, the presence or absence of the rough processing step (S7), the degree of the process in the finish processing step (S8) for finishing. Therefore, first, the respective steps of the process (a process for making the continuous casting rod-shaped material having a small diameter into the shaped component) of FIG. 10 will be described, and then, regarding the process (a process for making the forged continuous casting rod-shaped material having a small diameter into the shaped component) of FIG. 11, differences from the process of FIG. 10 (particularly, the forging step (S9)) will be described.

<Continuous Casting Step S1>

As a method of manufacturing the material, a continuous casting method of continuously casting a material having a small diameter is applied. That is, a molten aluminum alloy having an adjusted predetermined component composition is cast to have a small diameter (rod shape: cylindrical rod shape) using the continuous casting method. Here, the specific aspect of the continuous casting is not particularly limited as long as the material can be cast at a high rate by means of casting during the continuous casting method (that is, the continuous casting method having a high solidification rate) and may be transverse continuous casting or vertical continuous casting, and it is possible to preferably apply a gas pressurization-type hot top continuous casting method or the like.

When the above-described continuous casting method is applied, the productivity improves, and it also becomes possible to obtain a cast rod-shaped material which has a fine cast structure and does not easily allow segregation. Furthermore, a rod-shaped material (cylindrical rod) obtained by means of continuous casting has an almost equiaxed grain structure as described above has which is a structure that is substantially uniform in the circumferential direction. Therefore, the material also obtains an excellent dynamic balance that is required for a compressor wheel. Furthermore, in the equiaxed grain structure of the continuous casting rod-shaped material, the structural difference between the casting direction and a direction orthogonal thereto is extremely smaller compared with that of an extruded material, and thus it is possible to suppress the fluctuation of the mechanical characteristics depending on directions at a relatively low level.

Here, during the continuous casting, the material is desirably cast at a casting rate of 150 mm/minute or higher so that the outer diameter reaches 25 mm or larger and 120 mm or smaller. When the material is cast at a casting rate of 150 mm/minute or higher into a small diameter of 120 mm or smaller, it is possible to obtain a structure in which the average number of grain boundaries intersected in the circumferential direction is minimized in the central portion and is maximized in the outer circumferential portion, that is, a structure which is relatively sparse in the central portion and is relatively dense in the outer circumferential portion although the structure is a fine equiaxed grain structure in which the structure in the radial direction on the transverse section does not significantly change. Meanwhile, when, out of the continuous casting methods, particularly, a transverse continuous casting method is applied, it is possible to set the casting rate to a high rate of 900 mm/minute or higher on an average, and in this case, it becomes possible to obtain a finer structure as a whole due to a significant rapid cooling effect.

<Homogenization Treatment Step S2>

A homogenization treatment is carried out as necessary on the continuous casting rod-shaped material having a small diameter obtained as described above. When the homogenization treatment is carried out, an effect of homogenizing segregation during casting is obtained, transition metal elements serving as recrystallization nuclei do not coarsen, and coarse recrystallization is prevented, which is preferable. The conditions of the homogenization treatment are not particularly limited; however, in the case of the Al—Cu—Mg-based alloy (2000-based alloy), the alloy is preferably heated at 470° C. to 520° C. for 8 hours to 24 hours, and, meanwhile, in the case of the Al—Si eutectic alloy, the alloy is preferably heated at 470° C. to 500° C. for 8 hours to 24 hours.

<Roll Correction Step S3 to Peeling Step S4>

After the homogenization treatment, roll correction is carried out as necessary in order to correct the curve of the continuous casting rod-shaped material using a roll, and furthermore, peeling (facing) is carried out in order to remove casting defect portions or unevenness on the surface.

<Cutting Step S5>

After the roll correction step and the peeling step, the continuous casting rod-shaped material is cut into short round rod-shaped materials having a predetermined length. That is, the continuous casting rod-shaped material is cut into an appropriate length depending on the subsequent steps, the axial line direction length of a compressor wheel, and the like.

<Thermal Treatment Step (T6 or T7) S6>

In a case in which no forging is carried out after cutting as described above, generally, a thermal treatment is carried out as necessary after the cutting. As the thermal treatment, for example, a T6 treatment in which an artificial aging treatment is carried out after a solution treatment or a T7 treatment in which a stabilization treatment is carried out after a solution treatment is applied. Meanwhile, here, the T6 treatment includes a so-called T61 treatment in which cooling (quenching) after heating in the solution treatment is carried out by means of warm water quenching. However, depending on cases, there are cases in which the thermal treatment step S6 is carried out before the cutting step S5.

Regarding the specific conditions of the thermal treatment, it is necessary to select the optimal conditions depending on the component composition of the alloy. For example, in a case in which a B1 alloy is used as the Al—Cu—Mg-based alloy (2000-based alloy), it is preferable to heat and hold the alloy at 480° C. to 540° C. for 0.5 hours to 4 hours (solution treatment), quench the alloy at a water temperature in a range of 20° C. to 75° C. and then carry out an artificial aging treatment or a stabilization treatment at 190° C. to 230° C. for 2 hours to 12 hours. In addition, in a case in which a B2 alloy is used as the Al—Cu—Mg-based alloy (2000-based alloy), it is preferable to heat and hold the alloy at 480° C. to 520° C. for 0.5 hours to 4 hours (solution treatment), quench the alloy at a water temperature in a range of 20° C. to 75° C., and then carry out an artificial aging treatment or a stabilization treatment at 180° C. to 220° C. for 2 hours to 12 hours. Furthermore, as the thermal treatment on the Al—Si eutectic alloy, it is preferable to heat and hold the alloy at 480° C. to 505° C. for 0.5 hours to 4 hours (solution treatment), quench the alloy at a water temperature in a range of 20° C. to 75° C., and then carry out an artificial aging treatment or a stabilization treatment at 170° C. to 220° C. for 2 hours to 12 hours.

When the above-described T6 treatment or T7 treatment is carried out, it is possible to further improve the strength.

<Rough Processing Step S7>

After the thermal treatment step, generally, a rough processing for processing the material into the shape of the shaped component by means of machining such as turning is carried out. That is, in a stage before the rough processing, generally, the material has a short cylindrical shape, and thus it is usual to obtain the shape of the shaped component by means of a rough processing such as turning. The shape of the shaped component obtained by means of the rough processing may be substantially a circular top-truncated conical shape or a bell shape similar to the shape illustrated in FIG. 5 as the shaped component 10 of the forging-completed material.

<Finish Processing Step S8>

After the rough processing, a finish processing such as cutting for forming the blade portion in the outer diameter portion or punching (drilling) for the shaft hole portion is carried out in order to complete the shape and dimensions of the compressor wheel. As this finish processing, ordinary machining may be applied. Meanwhile, as machining such as cutting in the finish processing, it is also possible to carry out machining including a plurality of steps.

In the above-described manner, a compressor wheel for which the continuous casting rod-shaped material having a small diameter is used as a shaped component can be obtained. However, in a case in which a forged material is used as the shaped component, a hot closed die forging step is provided in the middle of the process (after the cutting step S5 and before the thermal treatment step S6) as described below.

<Forging Step (Hot Closed Die Forging S9)>

When hot closed die forging is carried out on the continuous casting rod-shaped material having a small diameter (the continuous casting rod-shaped material cut into a predetermined short length in the cutting step S5), the continuous casting rod-shaped material is inserted into a cavity in a forging die so that the central axis line of a material for forging (the short continuous casting rod-shaped material having a small diameter) coincides with the rotational center axis line of a compressor wheel product to be obtained and is forged by means of uniaxial pressurization so that the forging pressurization direction is along the casting direction during the continuous casting of the material for forging, thereby obtaining, for example, the forging-completed material (shaped component) 10 as illustrated in FIG. 5. In the above-described forging-completed material (shaped component) 10, a portion of reference sign 12 corresponds to the rotary shaft portion 3 in the compressor wheel, particularly, a portion 14 on one end side thereof corresponds to a protrusion portion (boss portion) 5 on one end side of the rotary shaft portion 3, furthermore, a portion of reference sign 16 corresponds to the blade portion 4 in the compressor wheel, and a portion of reference sign 18 corresponds to the blade root portion 7 in the compressor wheel.

When the above-described closed die forging is carried out, the structure becomes more dense, and thus it becomes possible to improve the strength and the rigidity as a whole, and it also becomes possible to obtain a structural state suitable for the desirable characteristics of the respective portions in the compressor wheel by effectively using the flow behavior (metal flow) of the material during forging.

Here, regarding the relationship between the cavity in the forging die during the forging and the material for forging, as described below in detail, it is preferable to determine the position of the material for forging on the basis of the inner circumferential surface or the inner circumferential edge of the cavity (generally, the inner circumferential surface or the inner circumferential edge of a lower die), center the material for forging so that the central axis line (the central axis line in a direction along the casting direction) of the material for forging coincides with the central axis line of the cavity (generally, the lower die) and thus coincides with the rotation axis line of the compressor wheel, and forge the material for forging.

Furthermore, regarding the plastic processing ratio in the forging, it is desirable to set the plastic processing ratio to lower than 20% in a portion which is intended to serve as the blade root portion by means of the finish processing step and to set the plastic processing ratio to 20% or higher in a portion which is intended to serve as the blade portion by means of the finish processing step. As a specific preferred aspect, the plastic processing ratios of the respective portions which are measured at a transverse section position that is a position (h/2) half as high as the total height (h) of the forging-completed material (shaped component) 10 in a direction along the axial direction need to satisfy the above-described conditions as illustrated in FIG. 5. Here, the transverse section at a position (h/2) half as high as the total height (h) of the forging-completed material (shaped component) 10 in a direction along the axial direction refers to a position at which both a relatively inside portion which is intended to serve as the blade root portion and an outside portion which is intended to serves as the blade portion (particularly, a portion that serves as a thin blade tip portion) are shown, and thus it becomes easy to evaluate the influence of the plastic processing ratio on the blade root portion and the thin blade tip portion using the plastic processing ratios measured in the respective portions at the above-described transverse section position of the half height.

Meanwhile, the plastic processing ratio can be obtained using, for example, the following expression after guide lines are drawn in a lattice shape on the material for forging, the material for forging is forged, and the distance between the guide lines on the material for forging is measured:

> Plastic processing ratio={(the distance between the guide lines on the material for forging)−(the length of the material lattice)}/(the length of the material lattice)×100(%).

In the above description, the plastic processing ratio is regulated as the plastic processing ratio measured at the transverse section position that is a position (h/2) half as high as the total height (h) of the forging-completed material (shaped component) 10 in a direction along the axial direction, and the plastic processing ratio at the above-described section position can be estimated using the above-described expression after a forging simulation that simulates actual forging is carried out, the transverse section of the material for forging from the simulation is divided in a lattice shape, and the distances between the lattices before and after the forging are measured.

Figure 12:
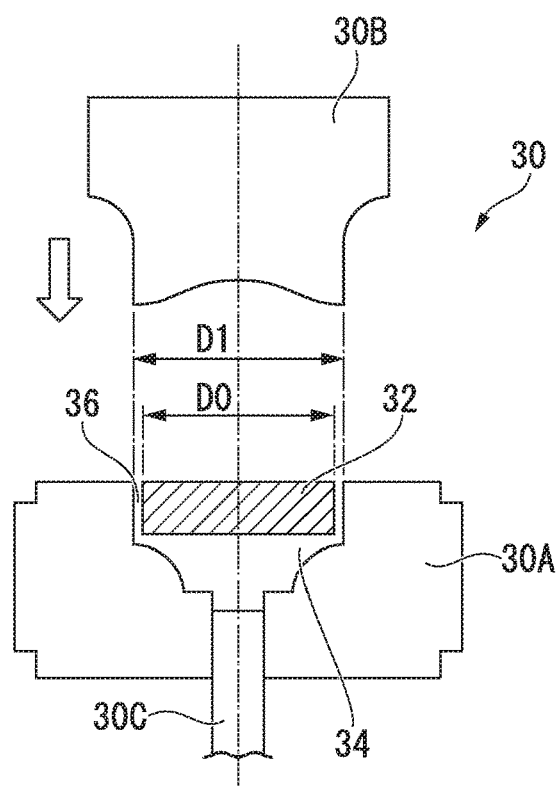
FIG. 12 is a schematic view seen from the vertical section side of a forging die which illustrates a first example of the relationship between the material for forging and the forging die in a forging step in a second embodiment of the method of manufacturing a turbo compressor wheel of the present invention.
Figure 13:
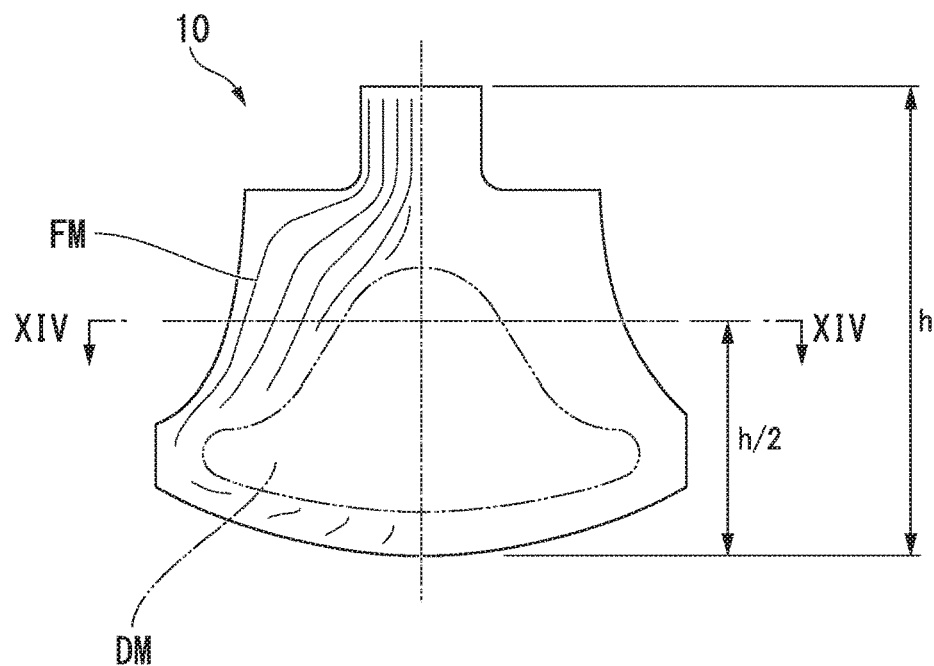
FIG. 13 is a schematic view of a metal flow caused by forging in the first example illustrated in FIG. 12 which is illustrated at a vertical sectional position in the forging-completed material.
Figure 14:
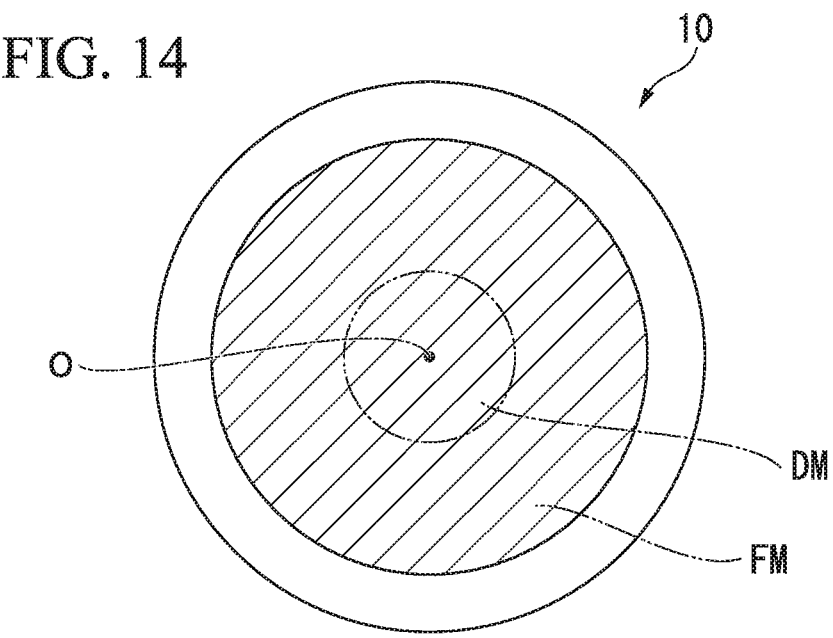
FIG. 14 is a transverse sectional view in the direction of the XIV-XIV line in FIG. 13.

An example of the above-described relationship between a forging die that is the closed forging die and the material for forging (a first example: an example in which a material for forging having a relatively large diameter is used) is illustrated in FIG. 12, and the metal flow of the material obtained from the forging-completed material in this case is illustrated in FIGS. 13 and 14. In addition, another example of the relationship between a forging die that is the closed forging die and the material for forging (a second example: an example in which a material for forging having a relatively small diameter is used) is illustrated in FIG. 15, and the metal flow of the material obtained from the forging-completed material in this case is illustrated in FIG. 16.

Figure 15:
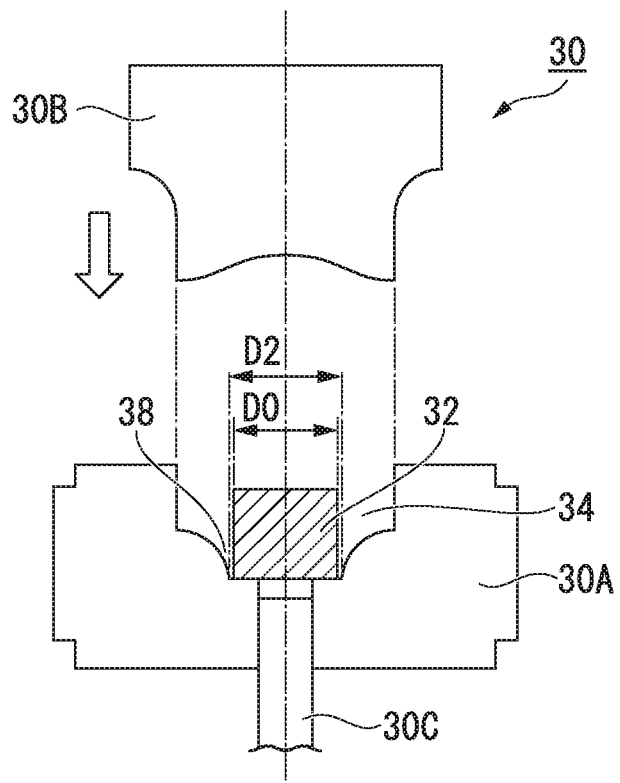
FIG. 15 is a schematic view seen from the vertical section side of the forging die which illustrates a second example of the relationship between the material for forging and the forging die in the forging step in the second embodiment of the method of manufacturing a turbo compressor wheel of the present invention.
Figure 16:
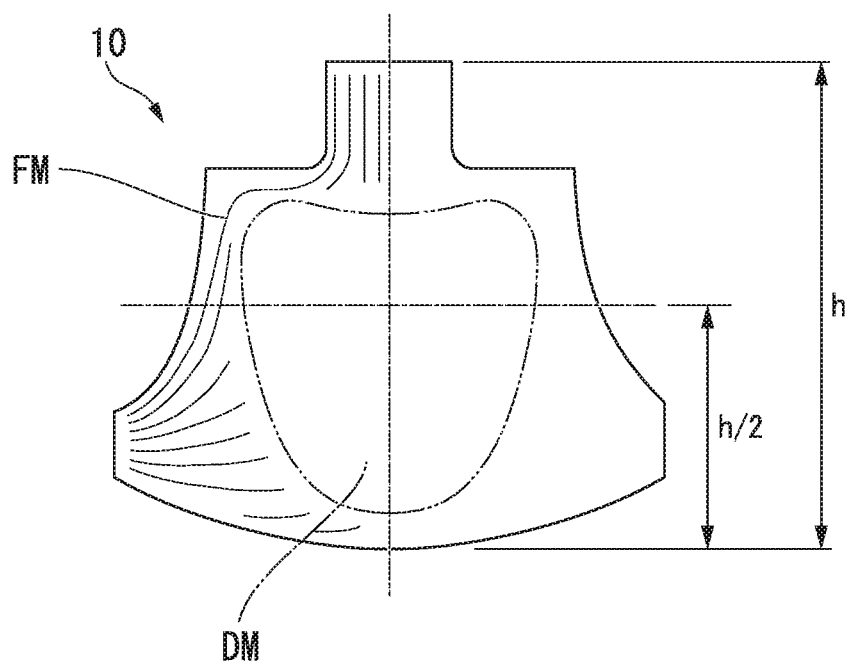
FIG. 16 is a schematic view of a metal flow caused by forging in the second example illustrated in FIG. 15 which is illustrated at a vertical sectional position in the forging-completed material.

Meanwhile, in FIGS. 12 and 15, a closed forging die 30 is constituted of a lower die 30A having a cavity 34 into which a material for forging (a short continuous casting rod-shaped material having a small diameter) 32 is inserted, an upper die 30B which moves down toward the lower die 30A so as to press the material for forging 32 into the cavity 34, and a knock-out pin 30C for ejecting the forged material (forging-completed material) from the cavity 34.

In the first example, that is, in a case in which the material for forging having a relatively large diameter is used, as illustrated in FIG. 12, the outer diameter D0 of the material for forging 32 which is subjected to forging is set so that the outer diameter becomes 0.10 mm to 2.0 mm smaller than the inner diameter D1 of a portion having the maximum inner diameter of the lower die 30A, that is, D0 falls into a range of > D0 min=D1-2.0 mm > D0 max=D1-0.10 mm.

In other words, the outer diameter of the material is set so that the width of the clearance (gap) 36 between the outer circumferential surface of the material for forging 32 and the portion having the maximum inner diameter of the lower die 30A falls in a range of 1.0 mm to 0.05 mm.

Meanwhile, in the second example, that is, in a case in which the material for forging having a relatively small diameter is used, as illustrated in FIG. 15, the outer diameter D0 of the material for forging 32 which is subjected to forging is set so that the outer diameter becomes 0.10 mm to 2.0 mm smaller than the inner diameter D2 of a portion corresponding to an end portion of the blade portion on the minimum diameter side of the compressor wheel product to be obtained in the lower die 30A, that is, D0 falls into a range of > D0 min=D2-2.0 mm > D0 max=D2-0.10 mm.

In other words, the outer diameter of the material is set so that the width of the clearance (gap) 38 between the outer circumferential surface of the material for forging 32 and the outer circumferential surface at the portion corresponding to the end portion of the blade portion on the minimum diameter side of the compressor wheel product to be obtained in the lower die 30A falls in a range of 1.0 mm to 0.05 mm.

In both cases of the first example and the second example, when the material for forging 32 is inserted into the cavity 34 of the lower die 30A, it is possible to center the material for forging so that the central axis line of the material for forging almost coincides with the central axis line of the cavity (generally, the lower die) and thus almost coincides with the rotation axis line of the compressor wheel, and furthermore, forge the material for forging while maintaining the centered state.

Here, in the case of the first example (FIG. 12), the metal flow of the material during the forging becomes a flow as illustrated by fine solid lines in the forging-completed material 10 illustrated in FIG. 13. That is, an outer circumferential portion which serves as the blade portion 4 in the compressor wheel, particularly, a portion corresponding to the thin tip side of the blade portion 4 forms a portion FM in which a large volume of a metal flow of the material is present, and on the other hand, a central portion (here, the central portion away downward from the boss portion 5; a portion including the blade root portion 7 in the rotary shaft portion 3 in the compressor wheel) in the forging-completed material 10 forms a dead metal portion DM in which the flow of the material is substantially absent. In addition, on the transverse section at a position (h/2) half as high as the total height (h) of the forging-completed material 10 illustrated in FIG. 5, as illustrated in FIG. 14, a portion corresponding to the rotary shaft portion 3 in the compressor wheel and a portion corresponding to the blade root portion 7 around the above-described portion forms the dead metal portion DM, and a portion corresponding to at least the tip portion (thin portion) of the blade portion 4 in the compressor wheel forms the portion FM in which a large volume of a flow of the material is present.

As described above, the portion corresponding to the rotary shaft portion 3 of the product and the portion corresponding to the blade root portion 7 at the circumferential edge of the above-described portion in the forging-completed material 10 form the dead metal portions DM in which the metal flow is absent during the forging, and thus the structure of the continuous casting rod-shaped material for forging is substantially maintained, and a structure having a lower density remains in the central portion compared with the outer circumferential portion. Therefore, similar to what has been already described about the continuous casting rod-shaped material, the number of grain boundaries which serve as a starting point of notch fatigue failure in the blade root portion in which stress concentrates during the high-speed rotation of the compressor wheel decreases, which contributes to the improvement in the notch fatigue strength. Meanwhile, a place on one end side of the rotary shaft portion of the compressor wheel serves as a boss portion into which a shaft is inserted, and, in this portion, a large volume of a metal flow is generated, and it becomes possible to suppress the generation of cracks during the pressure-fitting of the shaft due to the strengthening effect of the forging. In addition, in a place corresponding to at least the tip portion of the blade portion in the outer circumferential portion, a large volume of a metal flow is generated, which contributes to the improvement in the strength and the rigidity of the blade portion in the compressor wheel rotating at high speed, particularly, the thin tip portion due to the strengthening effect of the forging.

As described above, when the forging guidelines (forging pressurization direction and the dimensional and positional relationship between the material for forging and the lower die) are regulated as described above for the forging-completed material, it is possible to easily satisfy the diverse required performances of the respective portions of the compressor wheel.

On the other hand, in the case of the second example (FIG. 15), the metal flow of the material during the forging becomes a flow as illustrated by fine solid lines in the forging-completed material 10 illustrated in FIG. 16. The metal flow in this case is slightly different from, but becomes substantially the same as the metal flow (FIG. 13) of the material during the forging in the case of the first example (FIG. 12). That is, an outer circumferential portion which serves as at least the tip portion of the blade portion 4 in the compressor wheel forms the portion FM in which a large volume of a metal flow of the material is present, and on the other hand, a central portion (here, the central portion away downward from the boss portion 5: a portion including the blade root portion 7 in the rotary shaft portion 3 in the compressor wheel) in the forging-completed material 10 forms a dead metal portion DM in which the flow of the material is substantially absent.

As described above, similar to what has been described above, the portion corresponding to the blade root portion 7 of the product in the forging-completed material 10 forms the dead metal portions DM in which the metal flow is absent during the forging, and thus the structure of the continuous casting rod-shaped material for forging is substantially maintained, a structure having a lower density remains in the central portion compared with the outer circumferential portion, and the number of grain boundaries which serve as a starting point of notch fatigue failure in the blade root portion in which stress concentrates during the high-speed rotation of the compressor wheel decreases, which contributes to the improvement in the notch fatigue strength. Meanwhile, a place on one end side of the rotary shaft portion of the compressor wheel serves as a boss portion into which a shaft is inserted, and, in this portion, a large volume of a metal flow is generated, and it becomes possible to suppress the generation of cracks during the pressure-fitting of the shaft due to the strengthening effect of the forging. In addition, in a place corresponding to at least the tip portion of the blade portion in the outer circumferential portion, a large volume of a metal flow is generated, which contributes to the improvement in the strength and the rigidity of the blade portion in the compressor wheel rotating at high speed, particularly, the thin tip portion due to the strengthening effect of the forging.

Meanwhile, regarding the hot forging temperature (the material temperature of the material for forging during the forging), the optimal temperature may be selected depending on the components of the material, and, for example, in a case in which the B1 alloy or the B2 alloy which is the Al—Cu—Mg-based alloy is used, the forging temperature is set to approximately 400° C. to 450° C., and in a case in which the Al—Si eutectic alloy is used, the forging temperature is set to approximately 390° C. to 440° C. Meanwhile, it is usual to uniformly form the above-described forging temperature even at the inside of the material by heating the material for forging using a heating furnace immediately before the material for forging is inserted into the forging die, and in this case, the heating duration is not particularly limited, and generally, may be set to approximately 30 minutes to 60 minutes.

In addition, generally, the forging-completed material obtained by carrying out the hot closed die forging as described above is subjected to the thermal treatment step (S6) such as the T6 treatment or the T7 treatment, which has been already described. Furthermore, unlike a case in which a continuous casting rod-shaped material is used as the shaped component without carrying out forging, the thermally-treated forged material forms a shape of the shaped component as illustrated in FIG. 5 as it is, and thus it is usual to carry out the finish processing (S8) without carrying out the rough processing step (S7 in FIG. 10). Here, it is also possible to constitute the finish processing with a plurality of steps in which cutting for cutting and removing the forged skin on the surface of the forging-completed material is provided as the initial step.

EXAMPLES

Example 1

Example 1 is an example in which forging was not carried out and a continuous casting rod-shaped material having a small diameter was used as a shaped component for a turbo compressor wheel.

That is, additive elements were added to an aluminum base metal, and the components were melted, thereby obtaining individual molten alloys of an alloy A having a component composition shown in Table 1 (corresponding to an AHS alloy of an Al—Si eutectic alloy), an alloy B1 which was an Al—Cu—Mg-based alloy (corresponding to a 2618 alloy), and an alloy B2 which was, similarly, an Al—Cu—Mg-based alloy. Each of the molten alloys was continuously cast into a round rod shape having an outer diameter of 49 mm at a casting rate of 300 mm/minute using a mold having an inner diameter of 4) 50 mm and a gas pressurization-type hot top continuous casting method, thereby obtaining a continuous casting rod-shaped material. A homogenization treatment in which the continuous casting rod-shaped material was held at 490° C. for 12 hours and then was cooled in the air was carried out on the continuous casting rod-shaped material, and facing (peeling) was carried out in order to remove a cast skin, thereby obtaining an aluminum alloy rod having φ45 mm. This aluminum alloy rod was cut using a saw cutting machine, thereby producing a cylindrical shaped component having a length of 40 mm. This cylindrical rod-shaped material was heated to 495° C., was held for two hours, then, was quenched in warm water (60° C.) (a so-called solution treatment was carried out), subsequently, was heated to 200° C., was held for eight hours (a so-called artificial aging treatment), and then was cooled in the air, thereby producing a material for a shaped component for a turbo compressor wheel.

A (circular) transverse section of this material was mirror-polished and then was etched so as to make crystal grains observable. Arc lines were respectively drawn in four views in the circumferential direction in a material central portion (a position 2 mm away outward from the center of the transverse section in the radial direction), a material middle portion (a position half the radius away outward from the center of the transverse section in the radial direction), and an outer circumferential portion of the material (a position 2 mm away inward from the outer circumferential surface in the radial direction), and the numbers of grain boundaries intersecting the arc lines were measured by means of microscopic observation at a magnification of 50 times. The number of grain boundaries intersected per unit arc was obtained by dividing the measured number of grain boundaries by the length of the arc line, and the average value of the numbers of grain boundaries intersected per unit arc length in the four views was considered as the average number of grain boundaries intersected.

TABLE 1

| Chemical component (mass %) | Si | Fe | Cu | Mn | Mg | Ni | Al |
|---|---|---|---|---|---|---|---|
| Alloy A | 12.5 | 0.21 | 4.3 | 0.08 | 0.6 | 0.06 | Remainder |
| Alloy B1 | 0.15 | 1.1 | 2.2 | 0.06 | 1.5 | 1.0 | Remainder |
| Alloy B2 | 0.4 | 0.22 | 3.5 | 0.9 | 1.5 | 0.05 | Remainder |

TABLE 2

| | | Average number of grain boundaries intersected in circumferential direction | | | | |
|---|---|---|---|---|---|---|
| Alloy type | Shaped component | Central portion | Middle portion | Outer circumferential portion | Ratio of outer circumferential portion/ central portion | Evaluation result Evaluation result of dynamic balance |
| Alloy A | Continuous cast material | 1.25 [grain boundaries/mm] | 2.50 [grain boundaries/mm] | 3.33 [grain boundaries/mm] | 2.66 | G6.3 cleared |
| Alloy B1 | Continuous cast material | 10.2 [grain boundaries/mm] | 12.2 [grain boundaries/mm] | 19.6 [grain boundaries/mm] | 1.92 | G6.3 cleared |
| Alloy B2 | Continuous cast material | 5.29 [grain boundaries/mm] | 7.25 [grain boundaries/mm] | 8.33 [grain boundaries/mm] | 1.57 | G6.3 cleared |
| Alloy B1 | Extruded material (comparative material | 20.4 [grain boundaries/mm] | 19.2 [grain boundaries/mm] | 22.7 [grain boundaries/mm] | 1.11 | G6.3 not satisfied |

Figure 17:
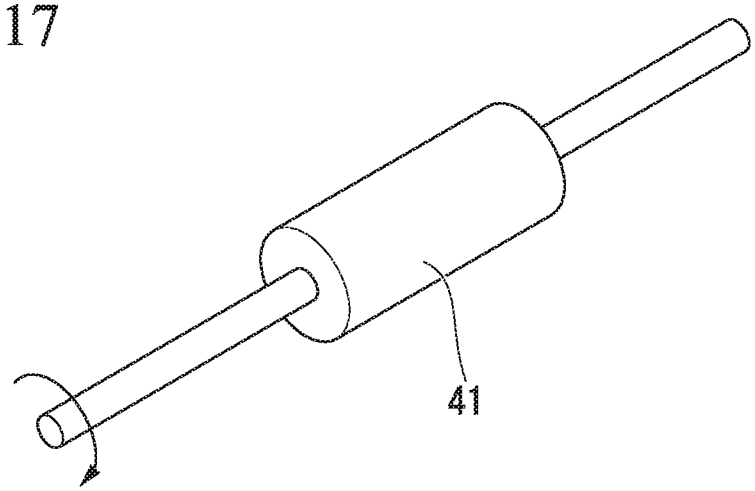
FIG. 17 is a schematic exploded view for illustrating a method of measuring the dynamic balance during a high-speed rotation of a shaped component for which the small-diameter continuous casting rod-shaped material is used as the material.

For a material made of the above-described continuous casting rod-shaped material, a shaft hole having φ20 mm was opened in the center by means of machining, and the outer diameter and both end surfaces of the material were cut at 0.7 mm, thereby producing a machined product for evaluation used to evaluate the dynamic balance as a shaped component for a turbo compressor wheel. An iron shaft having φ20.02 mm (machining-completed shaft) was pressure-fitted into the shaft hole in the machined product. The obtained shaft-attached machined product 41 was mounted in a dynamic balance measurement instrument as illustrated in FIG. 17 and was rotated at 10,000 rpm, and the dynamic balance during a high-speed rotation was evaluated by investigating whether or not the grade of the balance quality requirements thereof regulated by JIS B 0905 clears the condition of the grade of G6.3 as the determination standard.

The average number of grain boundaries intersected in the circumferential direction of the material made of the continuous casting rod-shaped material and the dynamic balance evaluation results of the machined product for evaluation, which were investigated as described above, are shown in Table 2.

Meanwhile, for the alloy B1, as a comparative example, the cast skin on a billet (φ210 mm) obtained using the gas pressurization hot top continuous casting method was removed by means of facing so as to obtain φ200 mm, the billet was heated at approximately 420° C. using a billet heater, was loaded into an extruder container, and was extruded into a round rod having φ45 mm at a push ratio of 1/20 by means of hot extrusion, thereby producing a material for a shaped component for a turbo compressor wheel. In a case in which the above-described extruded material is used as well, the average number of grain boundaries intersected in the circumferential direction in the extruded material was investigated, and furthermore, the same dynamic balance evaluation test as above was carried out. The results thereof are shown in Table 2.

As is clear from Table 2, in the material made of the continuous casting rod-shaped material having a small diameter (Invention Example), regardless of the alloys used, the condition of the average number of grain boundaries intersected in the circumferential direction (sparseness and denseness) satisfies the condition regulated in the present invention, and the evaluation result of the dynamic balance also cleared G6.3, whereby it was confirmed that the material had a favorable dynamic balance.

In contrast, in the comparative example for which the extruded material was used, the condition of the average number of grain boundaries intersected in the circumferential direction failed to satisfy the condition regulated in the present invention (minimized in the middle portion), and the evaluation result of the dynamic balance also failed to clear G6.3, whereby it was clarified that the dynamic balance was poor.

Example 2

Example 2 is an example in which a continuous casting rod-shaped material having a small diameter was manufactured, and hot closed die forging was carried out on the continuous casting rod-shaped material having a small diameter as a material for forging, thereby producing a shaped component for a turbo compressor wheel. Meanwhile, in this example, the dimensional relationship between the forging die and the material for forging was similar to that in the example illustrated in FIG. 12 (the first example), that is, the dimensional relationship in an example in which a material for forging having a large diameter was used.

Additive elements were added to an aluminum base metal, and the components were melted. Similar to Example 1, each molten alloy of an alloy A shown in Table 1 (an Al—Si eutectic alloy), an alloy B1 (corresponding to a 2618 alloy of an Al—Cu—Mg-based alloy), and an alloy B2 (an Al—Cu—Mg-based alloy) was continuously cast into a round rod shape having an outer diameter of 49 mm at a casting rate of 300 mm/minute using a mold having an inner diameter of φ50 mm and a gas pressurization-type hot top continuous casting method, thereby obtaining a continuous casting rod-shaped material. A homogenization treatment in which the continuous casting rod-shaped material was held at 490° C. for 12 hours and then was cooled in the air was carried out on the continuous casting rod-shaped material, and facing (peeling) was carried out in order to remove the cast skin, thereby obtaining an aluminum alloy rod having φ45 mm. This aluminum alloy rod was cut using a saw cutting machine, thereby producing a cylindrical shaped component (a material for forging) having a length of 40 mm. The process up to here was the same as that in Example 1.

This cylindrical material was used as a material for forging, was heated to 420° C., and was hot-forged into a bell-shaped forged shaped component using a closed forging die illustrated in FIG. 12. This forged shaped component was heated to 495° C., was held for two hours, was quenched in warm water (60° C.) (so-called solution treatment), subsequently, was heated to 200° C., was held for eight hours (so-called artificial aging), and then was cooled in the air. Meanwhile, the difference between the outer diameter of the cylindrical material (the material for forging) and the inner diameter of the maximum inner diameter portion of the closed forging die (twice the width of a gap 36 therebetween) was set to be 0.6 mm.

A transverse section at a position half as high as (refer to h and h/2 in FIG. 5) the total height of the forging-completed material (shaped component) was mirror-polished in the same manner as in Example 1 and was etched so as to make crystal grains observable, and the average numbers of grain boundaries intersected in the circumferential direction in the central portion, the middle portion, and the outer circumferential portion were investigated.

Figure 18:
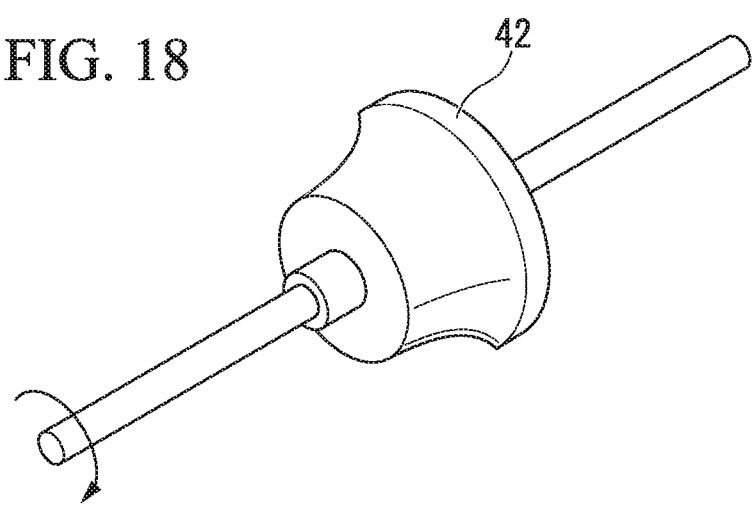
FIG. 18 is a schematic exploded view for illustrating a method of measuring the dynamic balance during a high-speed rotation of a shaped component for which the forging-completed material is used as the material.

For the above-described shaped component, a shaft hole having φ6 mm was opened in the center, and the outer circumferential surface and both end surfaces of the shaped component were cut at 0.7 mm, thereby producing a machined product for evaluating the dynamic balance. An iron shaft having φ6.02 mm (machining-completed shaft) was pressure-fitted into the shaft hole in the machined product. The obtained shaft-attached machined product 42 was mounted in a dynamic balance measurement instrument as illustrated in FIG. 18 and was rotated at 10,000 rpm, and the dynamic balance during a high-speed rotation was evaluated by investigating whether or not the grade of the balance quality requirements thereof regulated by JIS B 0905 clears the condition of the grade of G6.3 as the determination standard.

The average number of grain boundaries intersected in the circumferential direction at the above-described height position and the dynamic balance evaluation results of the shaped component made of the forging-completed material, which were investigated as described above, are shown in Table 3. Meanwhile, the average number of grain boundaries intersected in the circumferential direction in the stage of the continuous casting rod-shaped material is the same as in Example 1 (refer to Table 2).

TABLE 3

Average number of grain boundaries intersected in circumferential direction

| Alloy type | Shaped component | Central portion | Middle portion | Outer circumferential portion | Ratio of outer circumferential portion/ central portion | Evaluation result Evaluation result of dynamic balance |
|---|---|---|---|---|---|---|
| Alloy A | Forged material (large-diameter material used) | 1.28 [grain boundaries/mm] | 2.61 [grain boundaries/mm] | 3.52 [grain boundaries/mm] | 2.75 | G6.3 cleared |
| Alloy B1 | Forged material (large-diameter material used) | 9.8 [grain boundaries/mm] | 12.0 [grain boundaries/mm] | 18.9 [grain boundaries/mm] | 1.93 | G6.3 cleared |
| Alloy B2 | Forged material (large-diameter material used) | 5.21 [grain boundaries/mm] | 6.90 [grain boundaries/mm] | 8.06 [grain boundaries/mm] | 1.55 | G6.3 cleared |

As is clear from Table 3, in the case of Example 2 as well in which the forging-completed material was used as the shaped component, for all the alloys, the condition of the average number of grain boundaries intersected in the circumferential direction (sparseness and denseness) at the above-described position satisfies the condition regulated in the present invention, and the evaluation result of the dynamic balance also cleared G6.3, whereby it was confirmed that the material had a favorable dynamic balance.

Meanwhile, for comparison, the dynamic balance during a high-speed rotation of the shaped component was evaluated in a case in which a continuous casting material was extruded, and the same hot closed die forging as in Example 2 was carried out on the extruded material, thereby manufacturing a shaped component having the same shape as in the case of Example 2, and consequently, it was confirmed that G6.3 was not cleared and the dynamic balance was poor.

Example 31

Example 3 is an example in which a continuous casting rod-shaped material having a small diameter which had a smaller outer diameter than that in Example 2 was manufactured, and hot closed die forging was carried out on the continuous casting rod-shaped material having a small diameter as a material for forging, thereby producing a shaped component for a turbo compressor wheel. Meanwhile, in Example 3, the dimensional relationship between the forging die and the material for forging was different from that in Example 2 and was similar to that in the example illustrated in FIG. 15 (the second example), that is, the dimensional relationship in an example in which a material for forging having a relatively small diameter was used.

The process is almost the same as that in Example 1 up to the production of a cylindrical material (material for forging) having a length of 40 mm using a continuous casting member. However, the outer diameter of the material for forging was 30 mm.

The cylindrical material was heated to 420° C. and was hot-forged into a forged shaped component having a bell shape using a closed forging die illustrated in FIG. 15. This forged shaped component was heated to 495° C., was held for two hours, was quenched in warm water (60° C.) (a so-called solution treatment), subsequently, was heated to 200° C., was held for eight hours (a so-called aging treatment), and then was cooled in the air. Meanwhile, the difference between the outer diameter of the cylindrical material (material for forging) and the inner diameter of a portion corresponding to an end portion of the blade portion on the minimum diameter side in the closed forging die (twice the width of a gap 38 therebetween) was set to be 0.6 mm.

A transverse section at a position half as high as (refer to h and h/2 in FIG. 5) the total height of the forging-completed material (shaped component) was mirror-polished in the same manner as in Example 2 and was etched so as to make crystal grains observable, and the average numbers of grain boundaries intersected in the circumferential direction in the central portion, the middle portion, and the outer circumferential portion were investigated.

For a shaped component made of the above-described forging-completed material, a shaft hole having φ6 mm was opened in the center by means of machining, and the outer circumferential surface and both end surfaces of the shaped component were cut at 0.7 mm, thereby producing a machined product for evaluating the dynamic balance. An iron shaft having φ6.02 mm (machining-completed shaft) was pressure-fitted into the shaft hole in the machined product. The obtained shaft-attached machined product 42 was mounted in a dynamic balance measurement instrument as illustrated in FIG. 18, and the dynamic balance during a high-speed rotation was evaluated in the same manner as described above.

The average number of grain boundaries intersected in the circumferential direction at the above-described height position and the dynamic balance evaluation results of the shaped component made of the forging-completed material, which were investigated as described above, are shown in Table 4.

Meanwhile, for comparison, the dynamic balance during a high-speed rotation of the shaped component was evaluated in a case in which a continuous casting material was extruded, and the same hot closed die forging as in Example 3 was carried out on the extruded material, thereby manufacturing a shaped component having the same shape as in the case of Example 3, and consequently, it was confirmed that G6.3 was not cleared and the dynamic balance was poor.

Hitherto, the preferred embodiments and examples of the present invention have been described, but these embodiments and examples are simply examples within the scope of the gist of the present invention, and thus the addition, omission, substitution, and other modification of constitutions are allowed within the scope of the gist of the present invention. That is, the present invention is not limited by the above description and is limited only by the scope of the accompanying claims, and it is needless to say that the present invention can be appropriately modified within the scope thereof.

The aluminum alloy turbo compressor wheel shaped component of the present invention can be applied to a shaped component for manufacturing a compressor wheel (impeller) used for a turbocharger used for internal combustion engines for an automobile and a variety of other transportation devices. In addition, the method of manufacturing a turbo compressor wheel of the present invention, similar to what has been described above, can be applied in order to actually manufacture a compressor wheel (impeller) used for a turbocharger used for internal combustion engines for an automobile and a variety of other transportation devices.

REFERENCE SIGNS LIST

1 COMPRESSOR WHEEL
3 ROTARY SHAFT PORTION
4 BLADE PORTION

TABLE 4

| | | Average number of grain boundaries intersected in circumferential direction | | | | |
| --- | --- | --- | --- | --- | --- | --- |
| Alloy type | Shaped component | Central portion | Middle portion | Outer circumferential portion | Ratio of outer circumferential portion/ central portion | Evaluation result Evaluation result of dynamic balance |
| Alloy A | Forged material (small-diameter material used) | 1.45 [grain boundaries/mm] | 2.70 [grain boundaries/mm] | 3.70 [grain boundaries/mm] | 2.55 | G6.3 cleared |
| Alloy B1 | Forged material (small-diameter material used) | 10.9 [grain boundaries/mm] | 13.5 [grain boundaries/mm] | 21.28 [grain boundaries/mm] | 1.95 | G6.3 cleared |
| Alloy B2 | Forged material (small-diameter material used) | 5.37 [grain boundaries/mm] | 7.35 [grain boundaries/mm] | 8.85 [grain boundaries/mm] | 1.65 | G6.3 cleared |

As is clear from Table 4, in the case of Example 3 as well in which the forging-completed material was used as the shaped component, and the relationship between the cylindrical shaped component having a small diameter (the material for forging) and the lower die was set as illustrated in FIG. 15, for all the alloys, the condition of the average number of grain boundaries intersected in the circumferential direction (sparseness and denseness) at the above-described position satisfies the condition regulated in the present invention, and the evaluation result of the dynamic balance also cleared G6.3, whereby it was confirmed that the material had a favorable dynamic balance.

7 BLADE ROOT PORTION
10 SHAPED COMPONENT (FORGING-COMPLETED MATERIAL)
20 CONTINUOUS CASTING ROD-SHAPED MATERIAL
30 FORGING DIE

The invention claimed is:

1. A shaped component for an aluminum alloy turbo compressor wheel,
wherein a continuous casting rod-shaped material having a small diameter is used as a material, the material has a cast structure in which the average number of grain boundaries intersected in a circumferential direction seen on a transverse section orthogonal to a casting direction is minimized in a central portion of the transverse section and is maximized in an outer circumferential portion, and the casting direction of the material is extending along a rotational center axis line direction of the compressor wheel.

2. The shaped component for an aluminum alloy turbo compressor wheel according to claim 1,
wherein the central portion of the material includes a portion which is intended to serve as a blade root portion in the turbo compressor wheel, and the outer circumferential portion includes a portion which is intended to serve as the blade portion on an outer circumferential side of the blade root portion in the turbo compressor wheel.

3. The shaped component for an aluminum alloy turbo compressor wheel according to claim 1,
wherein the continuous casting rod-shaped material is a material that is continuously cast at a casting rate of 150 mm/minute or higher so as to obtain an outer diameter of 25 mm or larger and 120 mm or smaller.

4. A shaped component for an aluminum alloy turbo compressor wheel;
which is made of a forged material obtained by hot forging a material made of a continuous casting rod-shaped material having a small diameter by means of closed die forging so that a forging pressurization direction is along a forging direction of the material and is along a rotational center axis line direction of the compressor wheel.

5. The shaped component for an aluminum alloy turbo compressor wheel according to claim 4,
wherein the continuous casting rod-shaped material has a cast structure in which the average number of grain boundaries intersected in a circumferential direction seen on a transverse section orthogonal to a casting direction is minimized in a central portion and is maximized in an outer circumferential portion.

6. The shaped component for an aluminum alloy turbo compressor wheel according to claim 5,
wherein the central portion of the continuous casting rod-shaped material includes a portion which is intended to serve as a blade root portion in the turbo compressor wheel, and the outer circumferential portion includes a portion which is intended to serve as the blade portion on an outer circumferential side of the blade root portion in the turbo compressor wheel.

7. The shaped component for an aluminum alloy turbo compressor wheel according to claim 4,
wherein the continuous casting rod-shaped material is a material that is continuously cast at a casting rate of 150 mm/minute or higher so as to obtain an outer diameter of 25 mm or larger and 120 mm or smaller.

8. The shaped component for an aluminum alloy turbo compressor wheel according to claim 4,
wherein the forged material has a forged structure in which the average number of grain boundaries intersected in the circumferential direction seen on a transverse section orthogonal to a forging pressurization direction at a position half as high as a total height of the closed forging die in a direction along the axial direction is minimized in the central portion and is maximized in the outer circumferential portion.

9. The shaped component for an aluminum alloy turbo compressor wheel according to claim 8,
wherein the central portion of the forged material includes a portion which is intended to serve as a blade root portion in the turbo compressor wheel, and the outer circumferential portion includes a portion which is intended to serve as the blade portion on an outer circumferential side of the blade root portion in the turbo compressor wheel.

10. The shaped component for an aluminum alloy turbo compressor wheel according to claim 4,
wherein, as the material, a material having an outer diameter which is 0.10 mm to 2.0 mm smaller than an inner diameter of a portion corresponding to a maximum diameter portion of the compressor wheel or an inner diameter of a portion corresponding to an end portion of a blade portion on a minimum diameter side of the compressor wheel in the closed forging die is used.

11. The shaped component for an aluminum alloy turbo compressor wheel according to claim 1,
wherein, as the aluminum alloy, an Al—Cu—Mg-based alloy is used.

12. The shaped component for an aluminum alloy turbo compressor wheel according to claim 1,
wherein, as the aluminum alloy, an Al—Si eutectic alloy is used.

13. A method of manufacturing a turbo compressor wheel, comprising:
a continuous casting step of obtaining a small-diameter material having a cast structure in which the average number of grain boundaries intersected in a circumferential direction seen on a transverse section orthogonal to a casting direction is minimized in a central portion and is maximized in an outer circumferential portion by continuously casting an aluminum alloy to have a small diameter; and
a finish processing step of machining the small-diameter material obtained from the continuous casting step into a compressor wheel shape so that the casting direction is along a rotational center axis line direction of the compressor wheel.

14. The method of manufacturing a turbo compressor wheel according to claim 13,
wherein the continuous casting step is a step of continuous casting at a casting rate of 150 mm/minute or higher so as to obtain an outer diameter of 25 mm or larger and 120 mm or smaller.

15. A method of manufacturing a turbo compressor wheel, comprising:
a continuous casting step of obtaining a small-diameter material having a cast structure in which the average number of grain boundaries intersected in a circumferential direction seen on a transverse section orthogonal to a casting direction is minimized in a central portion and is maximized in an outer circumferential portion by continuously casting an aluminum alloy to have a small diameter;
a forging step of determining a position of the small-diameter material obtained from the continuous casting step with respect to a forging die so that a central axis line of the small-diameter material coincides with a rotational center axis line of a compressor wheel product to be obtained and carrying out hot closed die forging so that a forging pressurization direction is along the casting direction of the small-diameter material; and
a finish processing step of machining the forged material obtained from the forging step into a compressor wheel shape.

16. The method of manufacturing a turbo compressor wheel according to claim 15,
wherein, as the small-diameter material that is subjected to the forging step, a material having an outer diameter which is 0.10 mm to 2.0 mm smaller than an inner diameter of a portion corresponding to a maximum outer diameter portion of a compressor wheel product to be obtained or an inner diameter of a portion corresponding to an end portion of a blade portion on a minimum diameter side of the compressor wheel product to be obtained in the forging die is used, and,
in the forging step, the position of the small-diameter material with respect to the forging die is determined by an inner circumferential wall of a portion corresponding to the end portion of the maximum diameter side or an inner circumferential wall of a portion corresponding to the end portion of the blade portion on the minimum diameter side in the forging die and the small-diameter material is subjected to closed die forging.

17. The method of manufacturing a turbo compressor wheel according to claim 15,
wherein, in the forging step, a plastic processing ratio is set to lower than 20% in a portion which is intended to serve as a blade root portion by means of a finish processing step and the plastic processing ratio is set to 20% or higher in a portion which is intended to serve as the blade portion by means of the finish processing step.

18. The method of manufacturing a turbo compressor wheel according to claim 15,
wherein, by means of the forging step, a forged material having a forged structure in which the average number of grain boundaries intersected in a circumferential direction seen on a transverse section orthogonal to the forging pressurization direction is minimized in a central portion and is maximized in an outer circumferential portion is obtained at a position half as high as a total height of the closed forging die in a direction along an axial direction thereof.

19. The method of manufacturing a turbo compressor wheel according to claim 15,
wherein, after the forging step and before the finish processing step, as the thermal treatment step, a solution treatment and an artificial aging hardening treatment after a stabilization treatment or a stabilization treatment are carried out.

20. The method of manufacturing a turbo compressor wheel according to claim 13,
wherein, as the aluminum alloy, an Al—Cu—Mg-based alloy is used.

21. The method of manufacturing a turbo compressor wheel according to claim 13,
wherein, as the aluminum alloy, an Al—Si eutectic alloy is used.

* * * * *